(12) United States Patent
Devall

(10) Patent No.: US 8,286,658 B2
(45) Date of Patent: Oct. 16, 2012

(54) ROLL-OVER VALVE WITH SHARED OVERFILL PROTECTION AND VACUUM RELIEF

(75) Inventor: Jeffrey E. Devall, Greenup, IL (US)

(73) Assignee: Stant USA Corp., Connersville, IN (US)

( * ) Notice: Subject to any disclaimer, the term of this patent is extended or adjusted under 35 U.S.C. 154(b) by 1537 days.

(21) Appl. No.: 11/420,852

(22) Filed: May 30, 2006

(65) Prior Publication Data

US 2006/0283501 A1 Dec. 21, 2006

Related U.S. Application Data

(60) Provisional application No. 60/688,291, filed on Jun. 7, 2005, provisional application No. 60/723,735, filed on Oct. 5, 2005.

(51) Int. Cl.
*F16K 17/19* (2006.01)
(52) U.S. Cl. ...... 137/39; 137/43; 137/493.1; 137/493.9; 123/518
(58) Field of Classification Search ............ 137/39, 137/43, 493, 493.1, 493.7–493.9; 123/516, 123/518–520
See application file for complete search history.

(56) References Cited

U.S. PATENT DOCUMENTS

| | | | |
|---|---|---|---|
| 4,317,467 A * | 3/1982 | Heyland | 137/493 |
| 4,694,847 A | 9/1987 | Szlaga | |
| 4,716,920 A | 1/1988 | Crute | |
| 4,735,226 A | 4/1988 | Szlaga et al. | |
| 4,753,262 A | 6/1988 | Bergsma | |
| 5,054,508 A * | 10/1991 | Benjey | 137/43 |
| 5,253,668 A | 10/1993 | Mills | |
| 5,392,804 A * | 2/1995 | Kondo et al. | 137/43 |
| 5,449,029 A | 9/1995 | Harris | |
| 5,518,018 A | 5/1996 | Roetker et al. | |
| 5,535,772 A | 7/1996 | Roetker et al. | |
| 5,566,705 A | 10/1996 | Harris et al. | |
| 5,584,278 A * | 12/1996 | Satoh et al. | 123/516 |
| 5,666,989 A * | 9/1997 | Roetker | 137/43 |
| 5,687,778 A * | 11/1997 | Harris | 137/43 |
| 5,694,968 A | 12/1997 | Devall et al. | |
| 5,755,248 A * | 5/1998 | Szlaga et al. | 137/43 |
| 6,422,261 B1 | 7/2002 | DeCapua et al. | |
| 6,481,592 B2 | 11/2002 | Harris | |
| 6,488,877 B1 | 12/2002 | Amburgey et al. | |
| 6,578,579 B2 | 6/2003 | Burnside et al. | |
| 6,779,544 B2 | 8/2004 | Devall | |
| 2002/0062861 A1 | 5/2002 | Devall | |

OTHER PUBLICATIONS

European Search Report dated Oct. 4, 2006 in connection with European Application No. 06252951, five pages.

* cited by examiner

*Primary Examiner* — Stephen M Hepperle
(74) *Attorney, Agent, or Firm* — Barnes & Thornburg LLP

(57) ABSTRACT

A tank venting system is configured to regulate air and fuel vapor flow between a fuel tank and a fuel vapor recovery canister. A roll-over valve is included in the tank venting system.

17 Claims, 15 Drawing Sheets

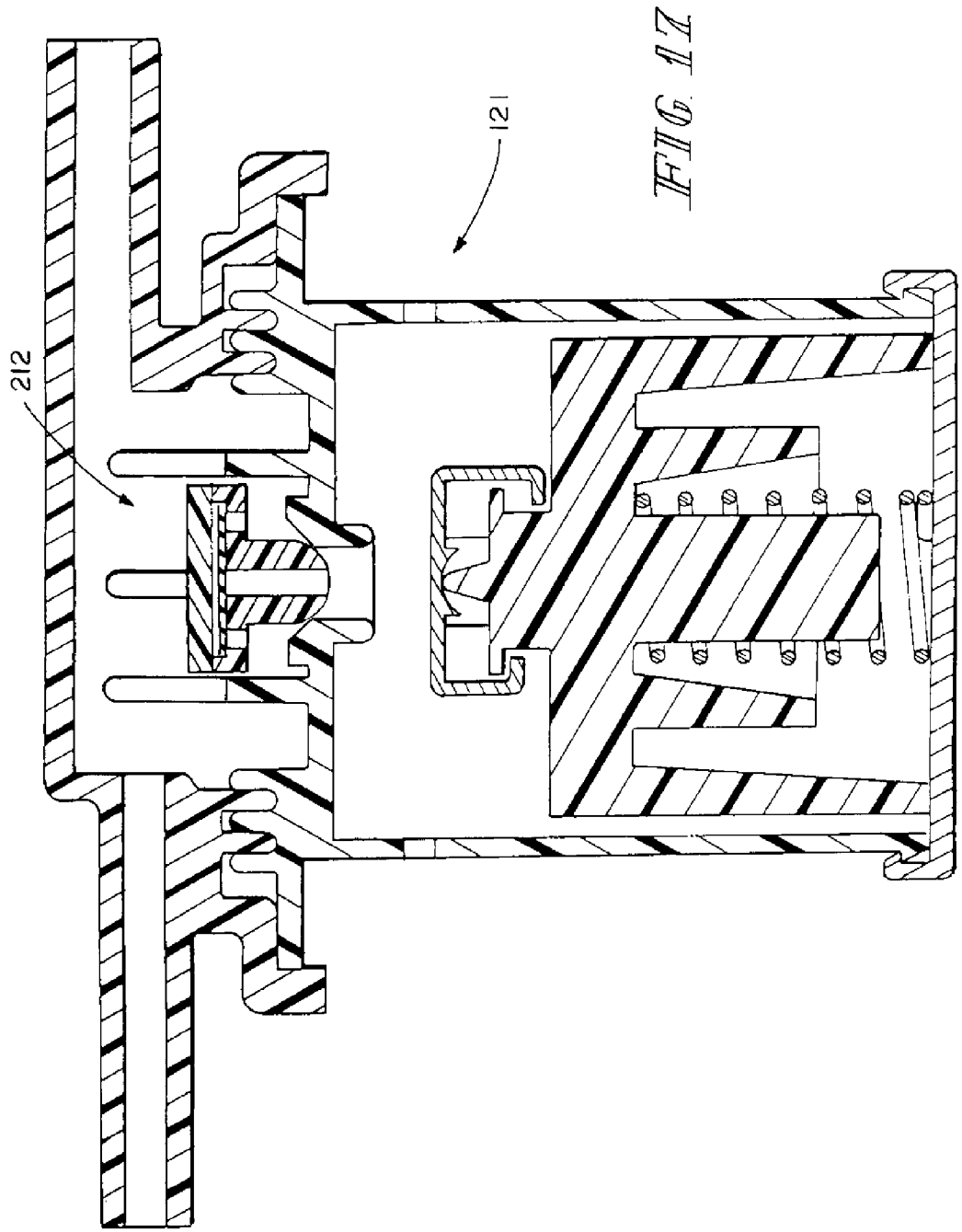

ROLL-OVER VALVE WITH SHARED OVERFILL PROTECTION AND VACUUM RELIEF

This application claims priority under 35 U.S.C. §119(e) to U.S. Provisional Application Ser. No. 60/688,291, filed Jun. 7, 2005 and U.S. Provisional Application Ser. No. 60/723,735, filed Oct. 5, 2005, which are expressly incorporated by reference herein.

BACKGROUND

The present disclosure relate to fuel system valves, and particularly to a roll-over valve for closing a venting passageway in a vehicle fuel system if the vehicle is rolled over in an accident or tilted during braking and cornering. More particularly, the present disclosure relates to a vent closure valve including an overfill protection system for preventing overfilling of a fuel tank equipped with one or more roll-over valves and a vacuum-relief system for relieving unwanted vacuum conditions in a fuel tank.

Vehicle fuel systems are known to include pressure-relief roll-over valves that are mountable on either the fuel tank or the filler neck of the vehicle. These roll-over valves are configured to permit fuel vapor to vent from the fuel tank when the vehicle is operating normally, and to prevent fuel from spilling from the fuel tank through the vent when the vehicle is tilted a preselected amount, or is rolled over in an accident. A roll-over valve should be equipped to accommodate a substantial flow rate of fuel vapor from the fuel tank because of the large size of many fuel tanks, and because of the volatility of certain blends of fuel.

SUMMARY

According to one aspect of the present disclosure, a flow controller is provided in a conduit extending from a fuel tank to a fuel vapor recovery canister. The flow controller comprises an air/vapor flow regulator that is movable in an internal space provided in a flow-control housing to regulate flow of atmospheric air into the fuel tank and pressurized fuel vapor from the fuel tank to the fuel vapor recovery canister. The air/vapor flow regulator operates to prevent overfilling the fuel tank during refueling and to maintain proper pressure levels in the fuel tank at all times.

Several configurations of the air/vapor flow regulator fall within the scope of the present disclosure. In one embodiment, the air/vapor flow regulator includes an overfill-protection ball normally seated on a pliable sealing disk in a vent chamber formed in a flow-control housing interposed between a fuel tank and a fuel vapor recovery canister. In other embodiments, the air/vapor flow regulator includes a "thumbtack-shaped" overfill-protection device formed to include an internal passage containing a sealing disk and located in a vent chamber formed in a flow-control housing.

According to another aspect of the present disclosure, a fuel tank vent unit includes a roll-over valve and a flow controller coupled to the roll-over valve. The flow controller comprises an air/vapor flow regulator arranged to move in a vent chamber formed in a flow-control housing. The air/vapor flow regulator provides a fuel tank overfill protection system, a fuel tank vacuum-relief system, and a pressure-relief system. In illustrative embodiments, the air/vapor flow regulator is adapted to communicate with other nearby fuel tank vent units that include roll-over valves so as to provide an over-fill protection, vacuum-relief system, and pressure-relief system that is "shared" among two or more fuel tank vent units.

In illustrative embodiments, the roll-over valve in the fuel tank vent unit includes a vent closure that is movable to close a vent passageway provided in the fuel tank vent unit during vehicle rollover or excessive vehicle tilting. The roll-over valve also includes two-stage means for moving the vent closure away from the vent passageway to an opened position later on to re-open the vent passageway so that excess pressure or vacuum in the fuel tank can be "relieved" by allowing fuel vapor and air flow through the vent passageway.

In illustrative embodiments, the overfill protection system is located in the vent passageway between the movable vent closure of the roll-over valve and a fuel vapor discharge outlet of the vent passageway. Also in illustrative embodiments, the vacuum-relief and pressure-relief system is located in the vent passageway and cooperates with the overfill protection system to regulate admission of ambient air from the atmosphere surrounding the fuel tank into the fuel tank through the vent passageway and to regulate discharge of pressurized fuel vapor from the fuel tank through the vent passageway to a vapor recovery canister or other external destination.

Additional features of the present disclosure will become apparent to those of ordinary skill in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 shows exposure of an air/vapor flow regulator to normal pressure/vacuum conditions in the fuel tank and use of the air/vapor flow regulator under those conditions to block discharge of fuel vapor from the fuel tank during and after normal fuel tank refueling activities to preserve any residual pressure extant in the fuel tank after tank refueling has been concluded;

FIG. 6 is a transverse sectional view similar to FIG. 5 showing discharge of pressurized fuel vapor from the fuel tank to the fuel vapor recovery canister during high pressure conditions;

FIG. 7 is a transverse sectional view similar to FIGS. 5 and 6 showing admission of atmospheric air into the fuel tank during high vacuum conditions;

FIG. 8 shows exposure of an air/vapor flow regulator to normal pressure/vacuum conditions in the fuel tank and use of the air/vapor flow regulator under those conditions to block discharge of fuel vapor from the fuel tank during and after normal fuel tank refueling activities to preserve any residual pressure extant in the fuel tank after tank refueling has been concluded;

FIG. 9 is a transverse sectional view similar to FIG. 8 showing discharge of pressurized fuel vapor from the fuel tank to the fuel vapor recovery canister during high pressure conditions;

FIG. 10 is a transverse sectional view similar to FIGS. 8 and 9 showing admission of atmospheric air into the fuel tank during high vacuum conditions;

FIG. 13 is an enlarged sectional view of a portion of the first fuel tank vent unit of FIG. 12 showing the ball-shaped overfill-protection device of FIG. 12 at rest closing a vent port formed in a deformable sealing disk at rest on a retainer (defined by several radially extending ribs) associated with a vent passageway extending through the first fuel tank vent unit and thus blocking discharge of fuel vapor from the fuel tank during and after normal tank re-fueling activities to preserve any residual pressure extant in the fuel tank after tank re-fueling has been concluded;

FIG. 14 is a sectional view similar to FIG. 13 showing discharge of pressurized fuel vapor from the fuel tank through the vent port past the "raised" overfill-protection "ball" through a fuel vapor discharge outlet to the fuel vapor recovery canister whenever the pressure of fuel vapor extant in the fuel tank exceeds a predetermined minimum (that is greater than the tank pressure normally encountered during and after tank re-fueling);

FIG. 15 is a sectional view similar to FIGS. 13 and 14 showing admission of atmospheric air into the fuel tank through the vent passageway owing to deformation of the deformable sealing disk underneath the overfill-protection ball induced by a vacuum in the fuel tank in accordance with a predetermined vacuum magnitude criterion;

FIG. 17 is a view similar to FIG. 16 showing yet another embodiment of a fuel tank vent unit in accordance with the present disclosure, which vent unit includes an air/vapor flow regulator of the type shown, for example, in FIGS. 5-7.

DETAILED DESCRIPTION

Figure 1:
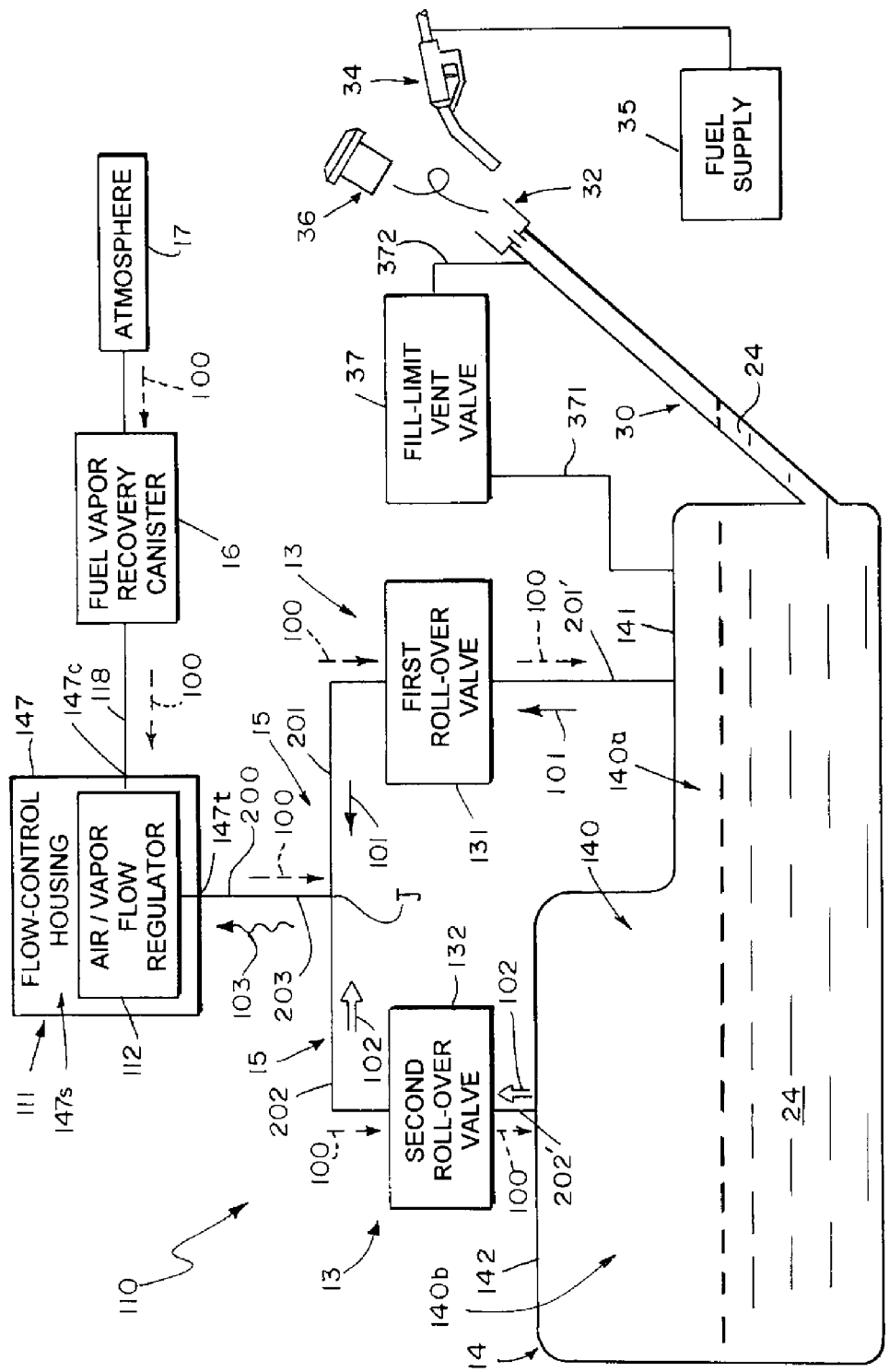
FIG. 1 is a diagrammatic view of a tank venting system in accordance with a first embodiment of the present disclosure showing a flow controller comprising a flow-control housing and an air/vapor flow regulator located in a conduit connecting first and second fuel tank roll-over valves to a fuel vapor recovery canister.

A fuel tank venting system in accordance with the present disclosure includes a flow controller located in a passageway extending between a fuel tank and a fuel vapor recovery canister and configured to control flow of air and fuel vapor through the passageway. In a first embodiment shown diagrammatically in FIG. 1, a flow controller 111 is separated from each of the roll-over valves 131, 132 included in a tank valve system 13 associated with a fuel tank 14. In a second embodiment shown diagrammatically in FIG. 11, a flow controller 11 is coupled to a fuel tank roll-over valve 40 to define a first fuel tank vent unit 21 that is separated from roll-over valves in other vent units 22, 23 associated with fuel tank 14.

Figure 11:
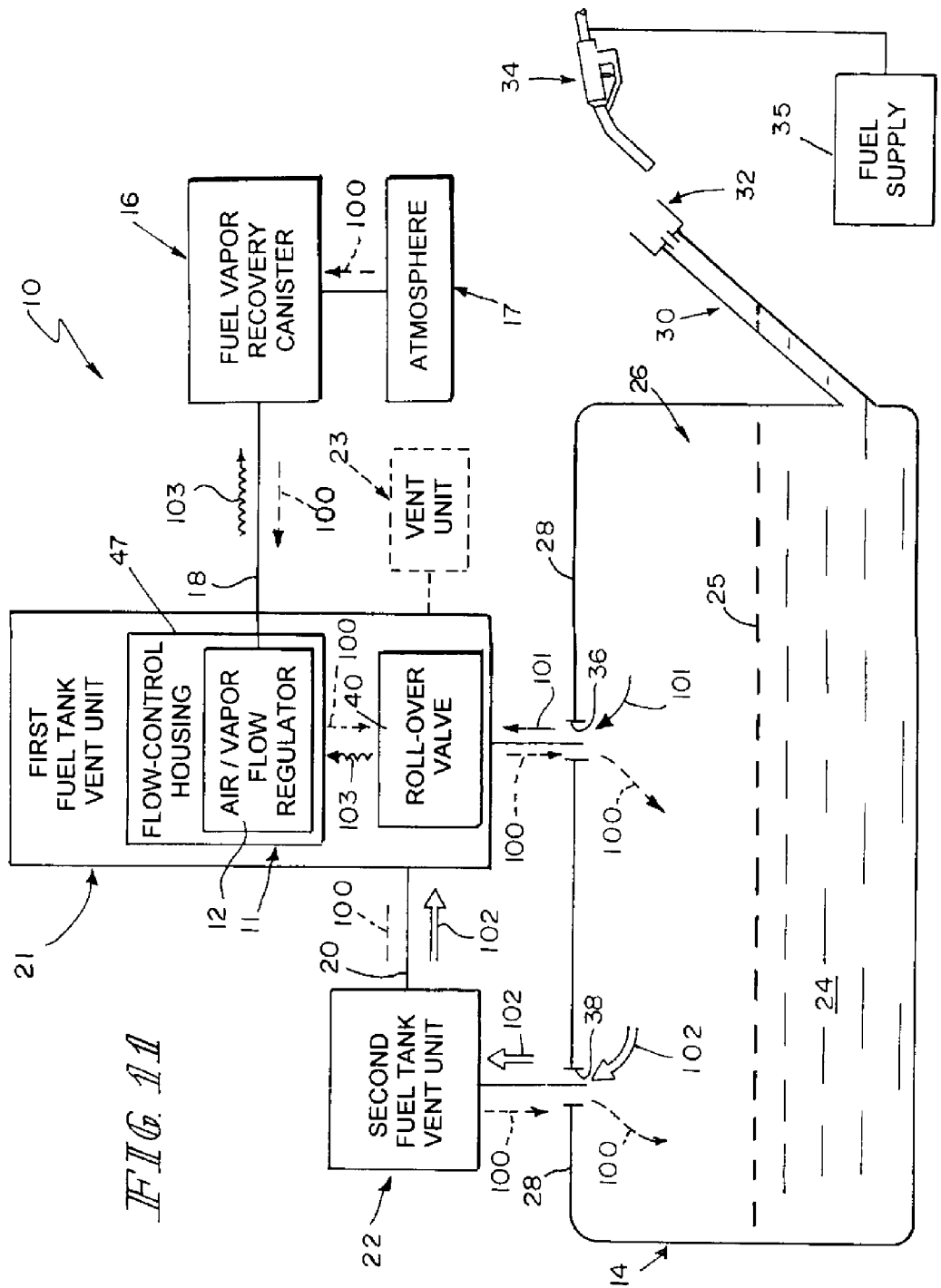
FIG. 11 is a diagrammatic view of a tank venting system in accordance with a second embodiment of the present disclosure showing that (1) pressurized fuel vapor discharged from a vapor space in a fuel tank through at least first and second fuel tank vent units combines in the first fuel tank vent unit to form a fuel vapor mixture that is regulated by and discharged to a fuel vapor recovery canister by an air/vapor flow regulator located in the first fuel tank vent unit and (2) ambient air from the atmosphere passing through fuel vapor recovery canister is allowed to flow through the first and second fuel tank vent units to relieve unwanted vacuum conditions in the vapor space of the fuel tank via the air/vapor flow regulator.

An air/vapor flow regulator is included in each of flow controllers 11 and 111 as suggested diagrammatically in FIGS. 1 and 11. As shown in FIG. 1, flow controller 111 includes an air/vapor flow regulator 112 contained in a flow-control housing 147. As shown in FIG. 11, flow controller 11 includes an air/vapor flow regulator 12 contained in a flow-control housing 47. Each air/vapor flow regulator is arranged to regulate air and fuel vapor flow between a fuel vapor recovery canister 16 and vent valves associated with fuel tank 14.

Figure 2:
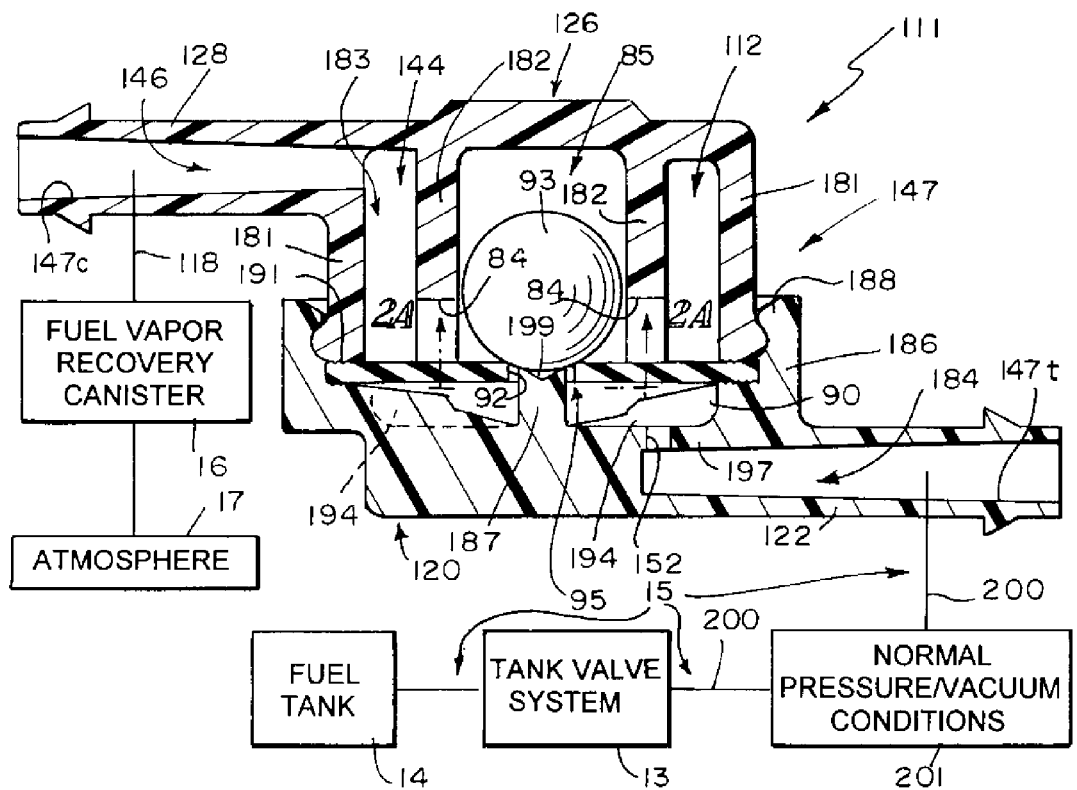
FIG. 2 is a transverse sectional view of an illustrative flow controller including a flow-control housing and a first embodiment of an air/vapor flow regulator suitable for use in the tank venting system illustrated in FIG. 1 during normal pressure/vacuum conditions in a fuel tank associated with the air/vapor flow regulator showing that the air/vapor flow regulator includes a sealing disk having an inner rim defining a vent port and a "ball-shaped" overfill-protection device supported above the sealing disk on a post extending into the vent port to mate with the inner rim to block flow of air and fuel vapor through the vent port during normal pressure/vacuum conditions.
Figure 3:
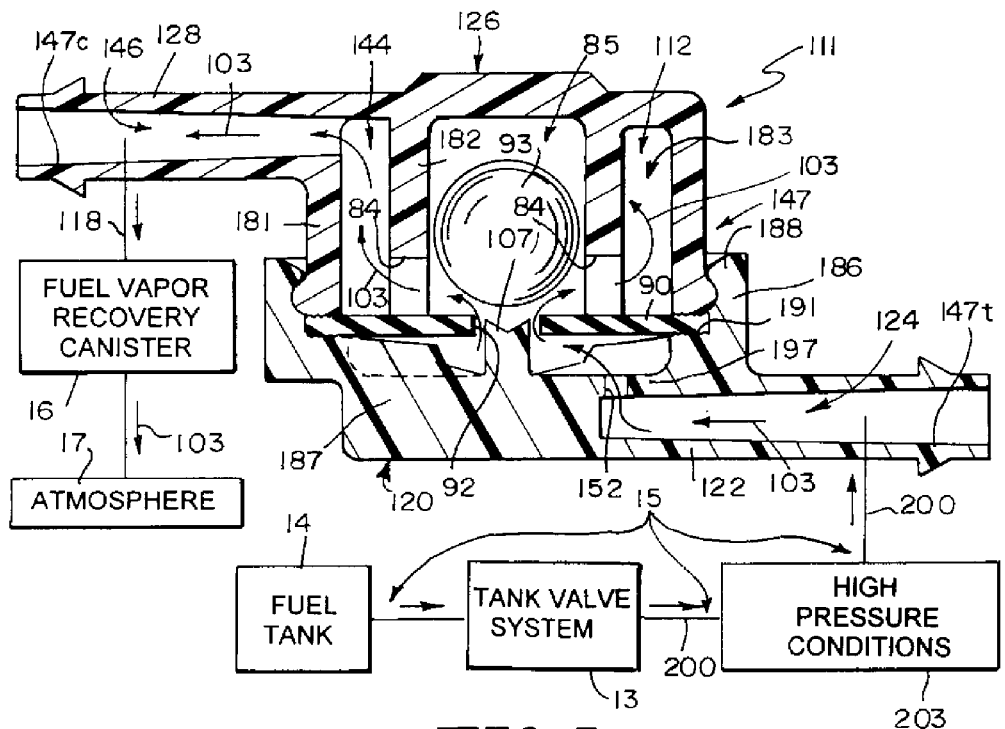
FIG. 3 is a sectional view similar to FIG. 2 showing discharge of pressurized fuel vapor from the tank valve system through the vent port past the "raised" overfill-protection ball through a fuel vapor-discharge outlet to the fuel vapor recovery canister whenever the pressure of fuel vapor extant in the fuel tank exceeds a predetermined minimum (that is greater than tank pressure normally encountered during and after tank refueling)
Figure 4:
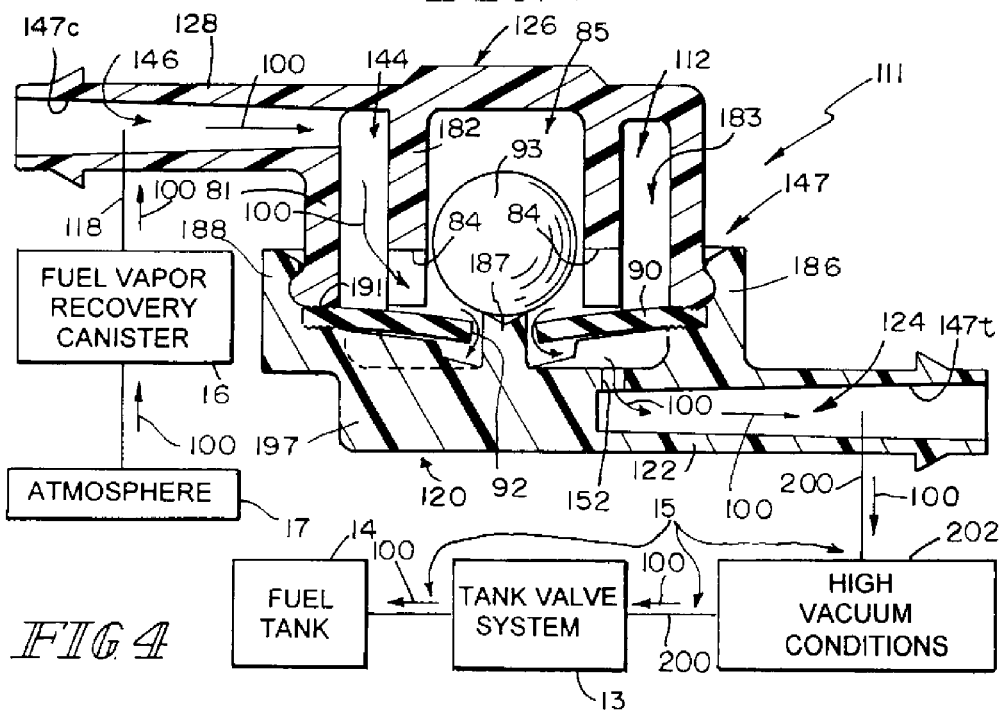
FIG. 4 is a sectional view similar to FIGS. 2 and 3 showing admission of atmospheric air into the fuel tank through the vent port owing to deformation of the deformable sealing disk to unmate with the overfill-protection ball supported on the post to open an annular flow channel between the inner rim of the sealing disk and an exterior portion of the overfill-protection ball induced by a vacuum in the fuel tank having a magnitude that is greater than a predetermined subatmospheric level.
Figure 5:
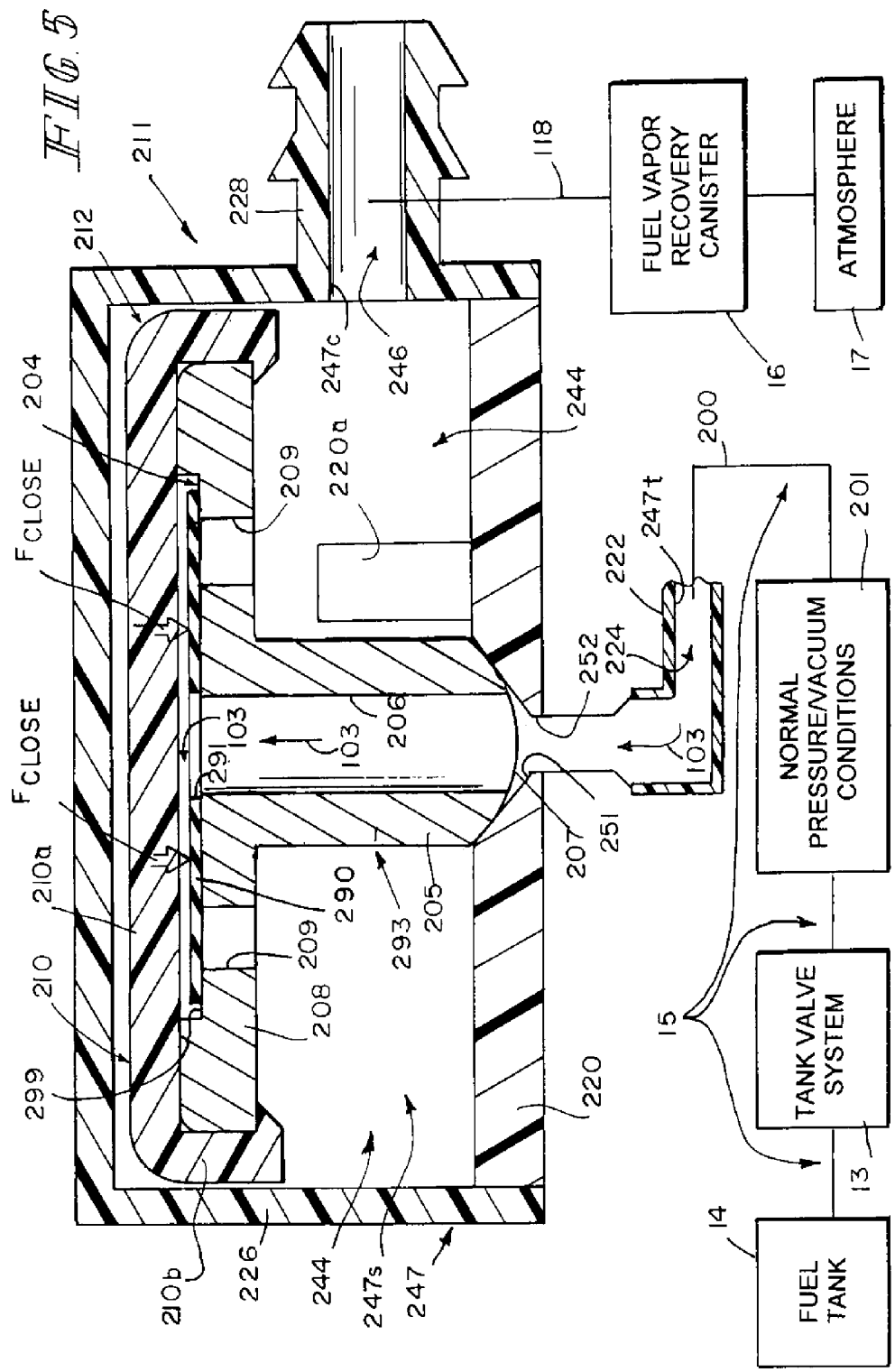
FIGS. 5-7 are transverse sectional views of another illustrative flow controller adapted to be used in the fuel tank venting system of FIG. 1 showing a second embodiment of an air/vapor flow regulator including a sealing disk located in a vent-control chamber formed in a "two-part" overfill-protection device having a downwardly extending, open-ended tubular stem and a "T-shaped" cross section.
Figure 6:
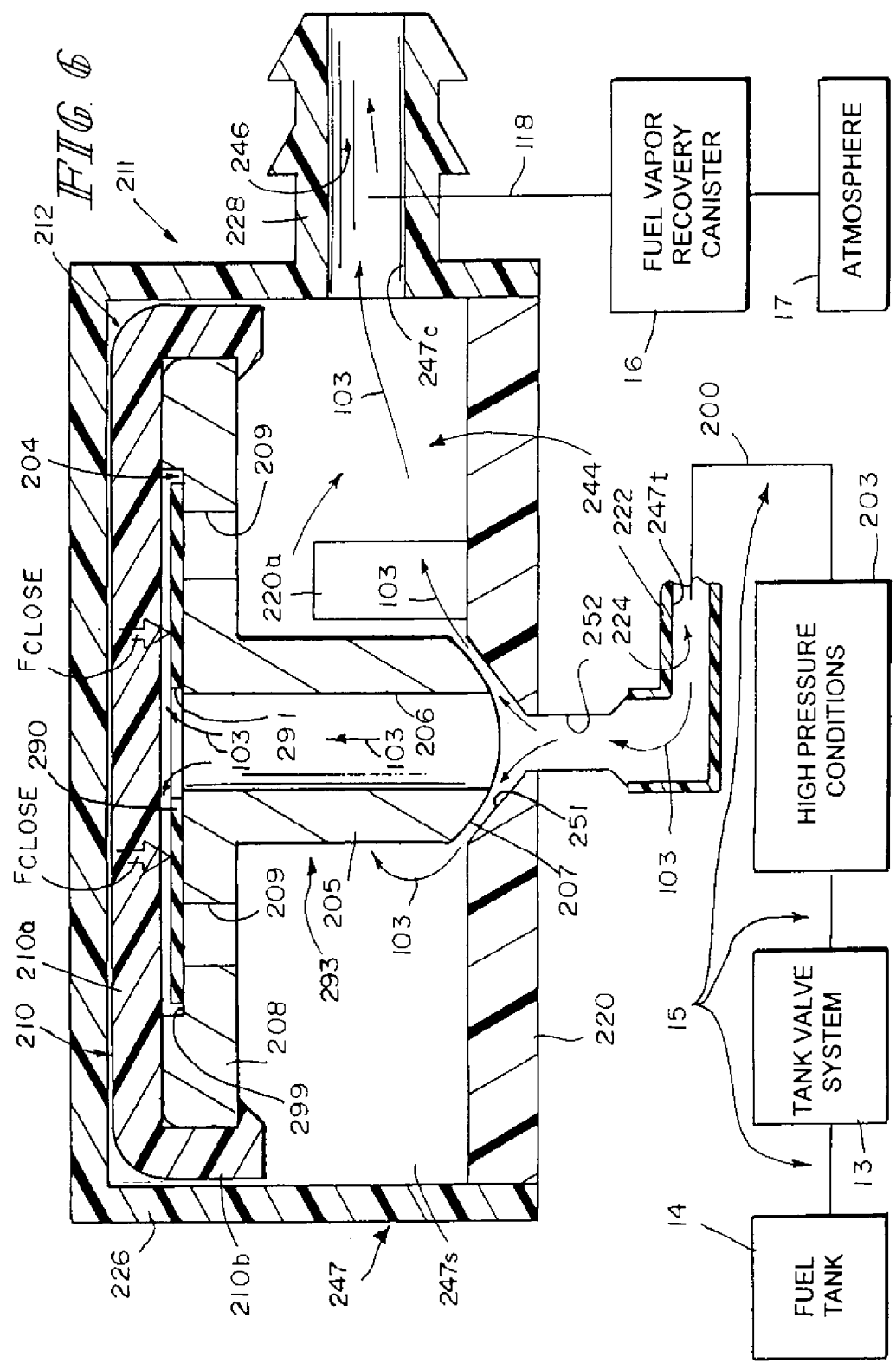
Figure 7:
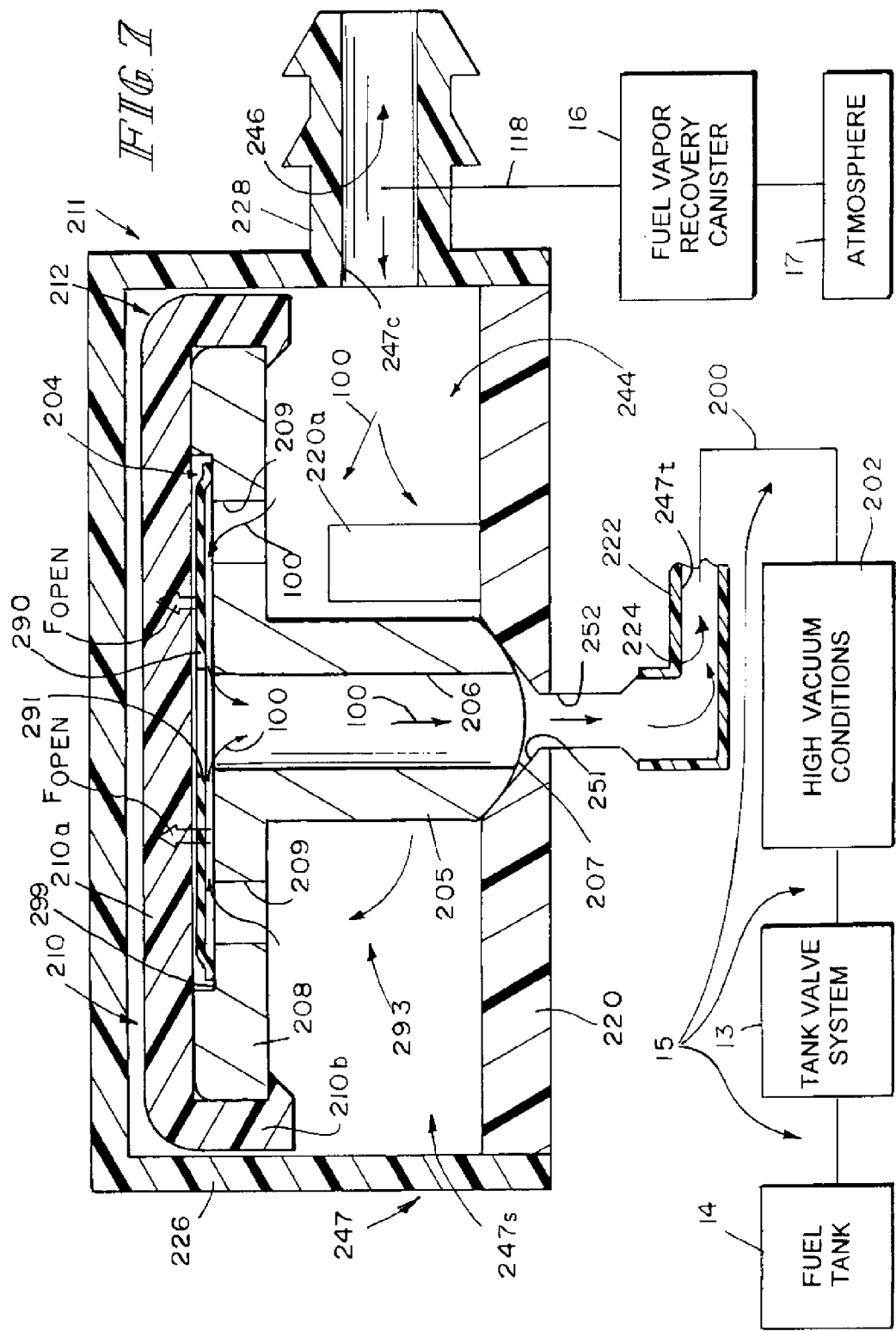
Figure 8:
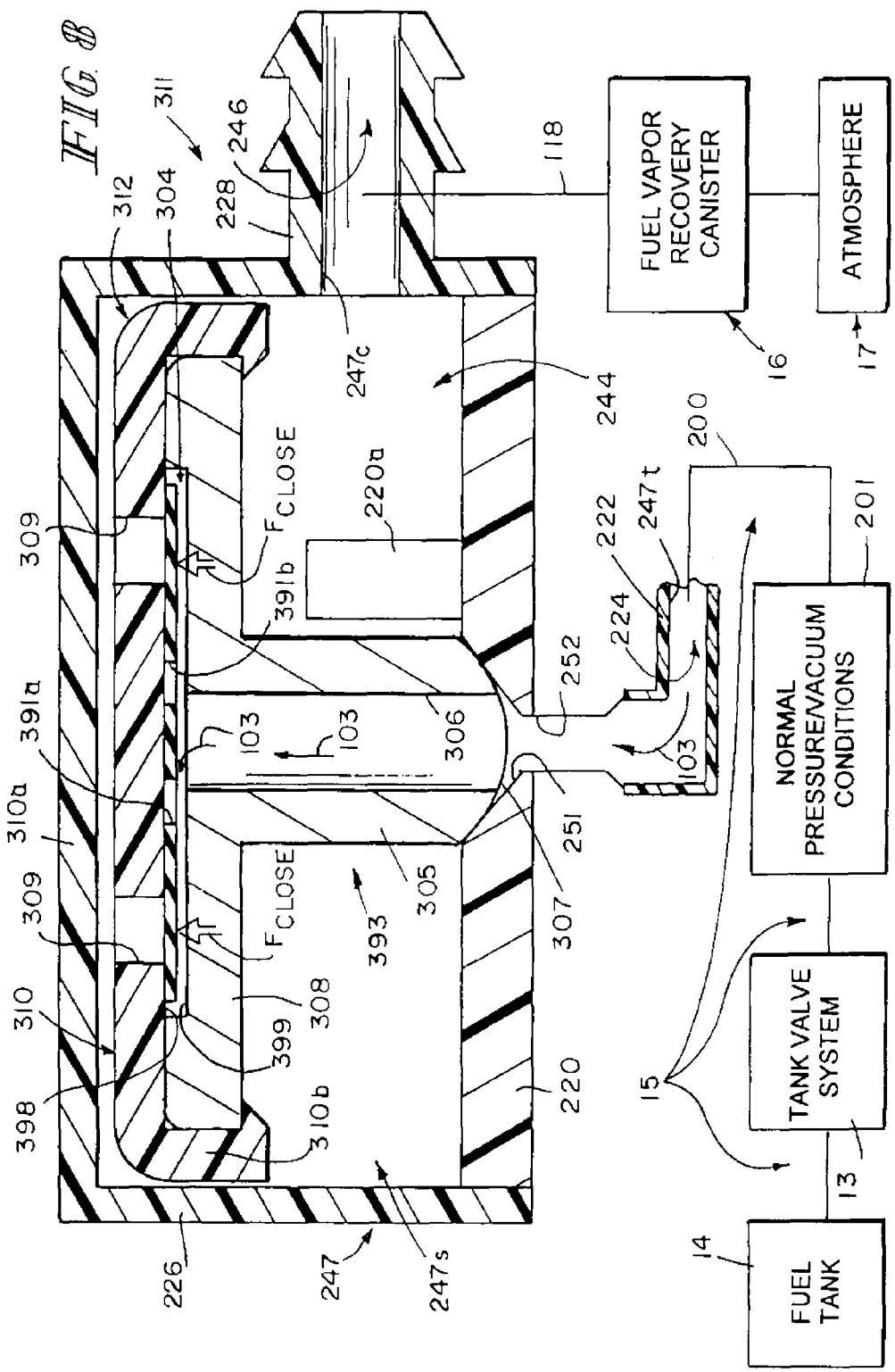
FIGS. 8-10 are transverse sectional views of yet another illustrative flow controller adapted to be used in the fuel tank venting system of FIG. 1 showing a third embodiment of an air/vapor flow regulator including a sealing disk located in a vent-control chamber formed in another overfill-protection device having a downwardly extending, open-ended tubular stem and a T-shaped cross section.
Figure 9:
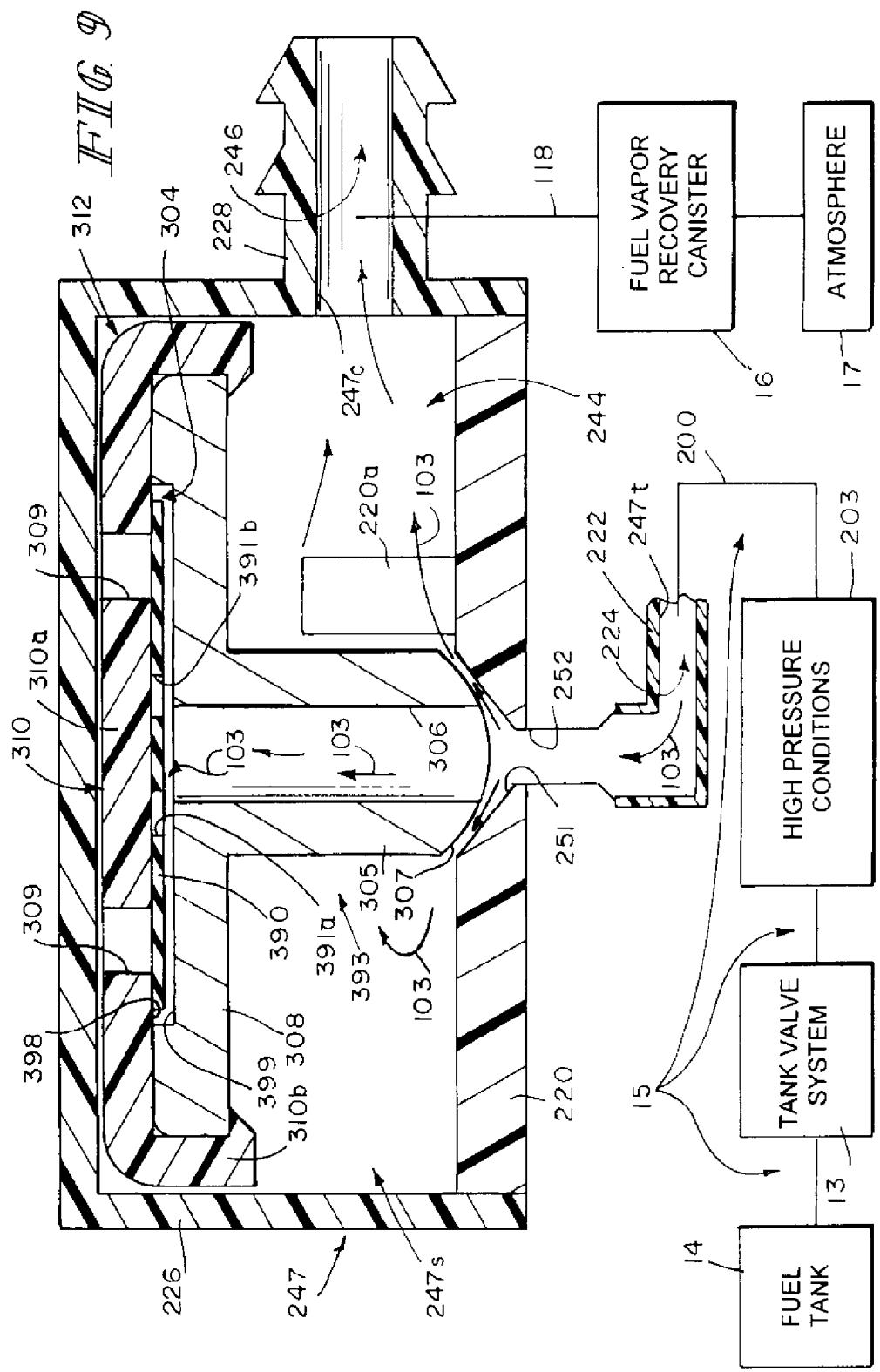
Figure 10:
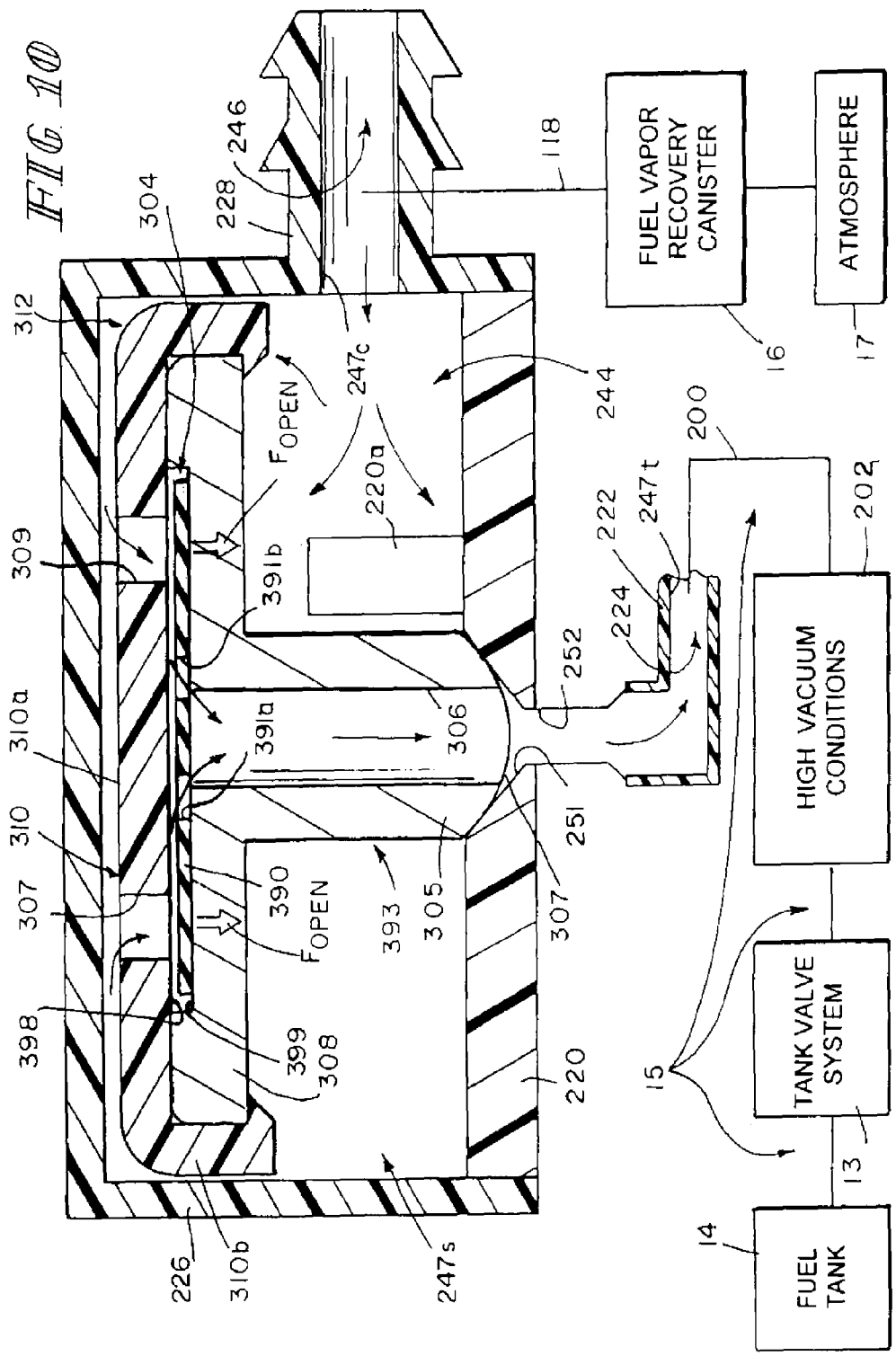

Several kinds of air/vapor flow regulators are disclosed herein. A regulator 112 in accordance with a first embodiment of the present disclosure is illustrated in FIGS. 2-4 and included in flow controller 111. A regulator 212 in accordance with a second embodiment of the present disclosure is illustrated in FIGS. 5-7 and included in flow controller 211. A regulator 312 in accordance with a third embodiment of the present disclosure is illustrated in FIGS. 8-10 and included in flow controller 311. Any of these regulators 112, 212, and 312 can be used in the tank venting systems illustrated in FIGS. 1 and 11

Figure 12:
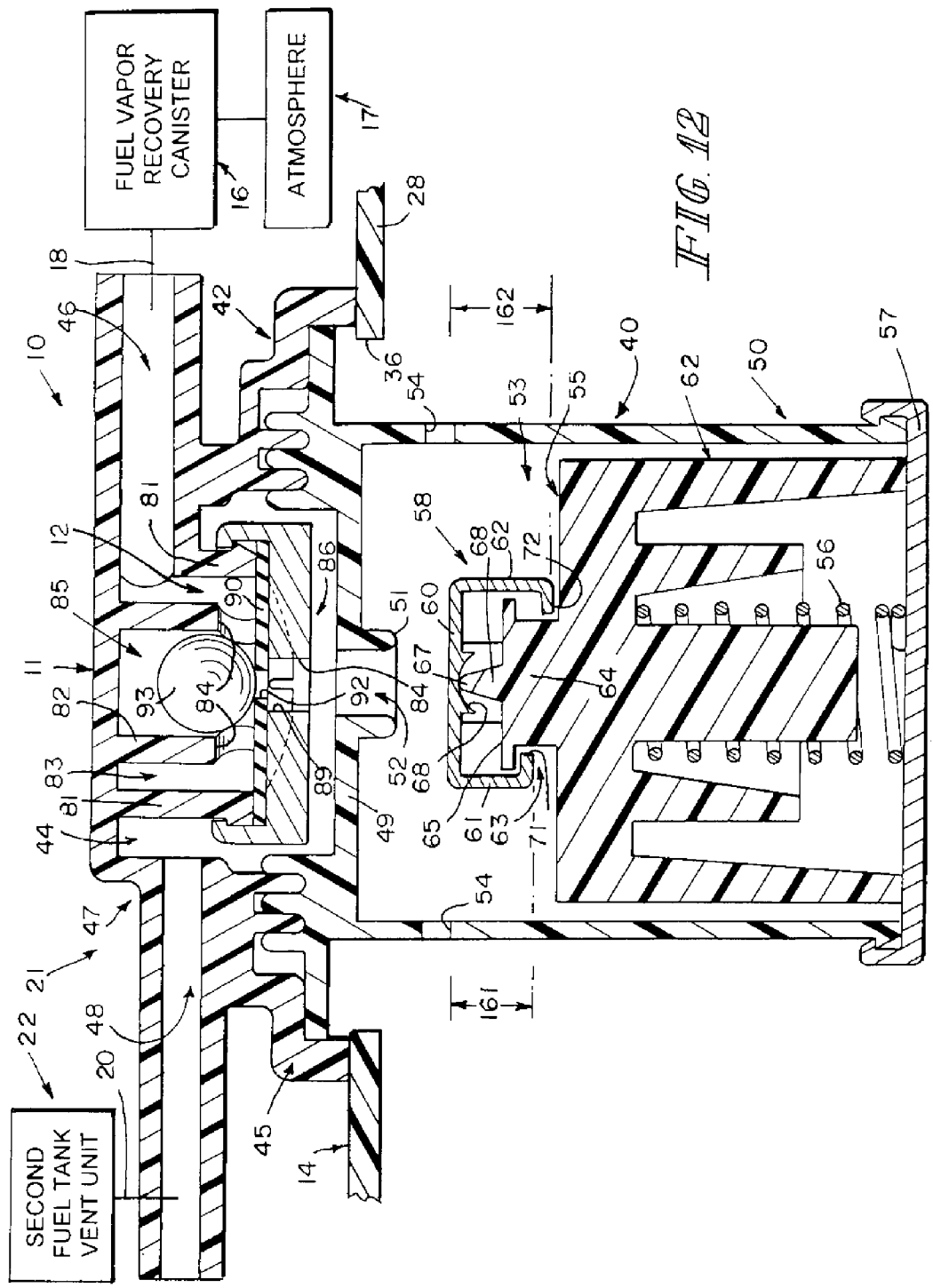
FIG. 12 is a transverse sectional view showing the first fuel tank vent unit of FIG. 11 mounted in a vent aperture formed in a top wall of a fuel tank and also showing diagrammatically a second fuel tank vent unit and a fuel vapor recovery canister coupled to the first fuel tank vent unit.

In an illustrative embodiment, tank valve system 13 includes first roll-over valve 131 and second roll-over valve 132 as suggested diagrammatically in FIG. 1. Each roll-over valve 131, 132 is configured to allow discharge of fuel vapor from vapor space 140 in fuel tank 14 to air/vapor flow regulator 112 as long as the roll-over valve remains relatively "upright." Whenever each roll-over valve 131, 132 is "inverted" or at least tilted a selected number of degrees (e.g., about 15° to about 90°) from a normal upright position, discharge of fuel vapor from vapor space 140 of fuel tank 14 to air/vapor flow regulator 112 is blocked. An illustrative embodiment of a suitable roll-over valve 40 is shown in FIG. 12 and described herein.

In illustrative embodiments, first roll-over valve 131 is mounted in an aperture formed in a first top wall 141 of fuel tank 14 for exposure to pressurized fuel vapor (and also liquid fuel during tank rollover) present in a first zone 140a of fuel tank vapor space 140 as suggested diagrammatically in FIG. 1. Second roll-over valve 132 is mounted in an aperture formed in a second (higher) top wall 142 of fuel tank 14 for exposure to pressurized fuel vapor (and also liquid fuel during tank rollover) present in a second zone 140b of fuel tank vapor space 140.

Air/vapor flow regulator 112 in flow controller 111 is coupled to fuel vapor recovery canister 16 by a canister conduit 118 as shown in FIG. 1. Air/vapor flow regulator 112 is shown diagrammatically in FIG. 1 and illustratively in FIGS. 2-4. A fluid-conducting passageway 15 is provided to transfer air and fuel vapor between flow controller 111 and fuel tank vapor space 140.

A vent conduit 200 included in fluid-conducting passageway 15 is coupled to air/vapor flow regulator 112 and is "split" as also shown in FIG. 1 to form a first branch 201 coupled to first roll-over valve 131, a second branch 202 coupled to second roll-over valve 132, and a regulator branch 203 coupled to air/vapor flow regulator 112 and to a junction (J) of first and second branches 201, 202 as suggested diagrammatically in FIG. 1. In this way, pressurized fuel vapor vented from either first roll-over valve 131 or second roll-over valve 132 flows through vent conduit 200 to reach air/vapor flow regulator 112. It is within the scope of this disclosure to add more roll-over valves as needed and more conduit branches as needed to couple the added roll-over valve(s) to vent conduit 200. Fluid-conducting passageway 15 further includes a conduit 201' communicating air and fuel vapor between first roll-over valve 131 and fuel tank vapor space 140 and a conduit 202' communicating air and fuel vapor between second roll-over valve 132 and fuel tank vapor space 140.

As suggested in FIG. 1, flow controller 111 includes a flow-control housing 147 formed to include an internal space 147s. Air/vapor flow regulator 112 is located in internal space 147s of flow-control housing 147. Flow-control housing 147 is formed to include a tank port 147t coupled to regulator branch 203 of vent conduit 200 included in fluid-conducting passageway. Tank port 147t opens into internal space 147s. Flow-control housing 147 is also formed to include a canister port 147c coupled to canister conduit 118 and adapted to communicate air and fuel vapor to and from internal space 147s. Canister port 147c opens into internal space 147s.

Fluid-conducting passageway 15 is configured to communicate with tank port 147t and fuel tank vapor space 140 as suggested diagrammatically in FIG. 1. First roll-over valve 131 is configured to provide means in fluid-conducting passageway 15 for blocking flow of pressurized fuel vapor discharged from fuel tank vapor space 140 through fluid-conducting passageway 15 and tank port 147t to internal space 147s formed in flow-control housing 147 whenever first roll-over valve 131 is tilted at least a selected number of degrees from a normal upright position so that fuel vapor from fuel tank vapor space 140 is unable to flow through fuel-conducting passageway 15 to reach internal space 147s in flow-control housing 147. Second roll-over valve 132 is configured to provide means in fluid-conducting passageway 15 for blocking flow of pressurized fuel vapor discharged from fuel tank vapor space 140 through fluid-conducting passageway 15 and tank port 147t to internal space 147s formed in flow-control housing 147 whenever second roll-over valve 132 is tilted at least a selected number of degrees from a normal upright position so that fuel vapor from fuel tank vapor space 140 is unable to flow through fuel-conducting passageway 15 to reach internal space 147s in flow-control housing 147.

As shown diagrammatically in FIG. 1, fuel tank 14 includes an interior region containing liquid fuel 24. Vapor space 140 is provided in that interior region above liquid fuel 24 and below top walls 141, 142 of fuel tank 14. A filler neck 30 is coupled to fuel tank 14 and formed to include an inlet 32 sized to receive a fuel-dispensing pump nozzle 34 coupled to fuel supply 35 after removal of a filler neck closure 36 from filler neck 30.

A fill-limit valve 37 is coupled to fuel tank 14 by a tank conduit 371 and to filler neck 30 by a filler neck conduit 372 as suggested diagrammatically in FIG. 1. Fill-limit valve 37 is configured to close a fuel vapor vent path from vapor space 140 through tank conduit 371 when fuel tank 14 is nearly filled with liquid fuel 24 during tank refueling activities. Such closure causes fuel vapor pressure in vapor space 140 to rise and liquid fuel 24 in fuel tank 14 to "back up" filler neck 30 toward inlet 32 and splash onto or reach a fill-limiting sensor (not shown) provided on pump nozzle 34. This triggers the pump nozzle 34 to shut off flow of any further liquid fuel 24 into filler neck 30.

In the illustrated embodiment, air/vapor flow regulator 112 in flow controller 111 blocks fuel vapor discharge to atmosphere 17 through first and second roll-over valves 131, 132. This vent-blocking action prevents dissipation of residual fuel vapor pressure in fuel tank vapor space 140 through first and second roll-over valves 131, 132 after fuel tank refueling has been completed.

As suggested diagrammatically in FIG. 1, fuel vapor 101 discharged from first roll-over valve 131 into conduit branch 201 mixes at junction (J) with fuel vapor 102 discharged from second roll-over valve 132 into conduit branch 202 to produce a fuel vapor mixture 103 that flows through regulator branch 203 of vent conduit 200 into air/vapor flow regulator 112 in flow controller 111. During and after tank refueling, air/vapor flow regulator 112 blocks discharge of fuel vapor mixture 103 to fuel vapor recovery canister 16 (and atmosphere 17) and thus maintains any residual pressure extant in vapor space 140 of fuel tank 14 after fuel tank 14 has been filled with liquid fuel 24 to its capacity. Such residual pressure in fuel tank vapor space 140 makes it harder for a pump nozzle operator to add more liquid fuel 24 into fuel tank 14 by pumping such flow slowly and sporadically in a practice known as "trickle fill."

Air/vapor flow regulator 112, even though located in a flow controller 111 that is remote from fuel tank 14, is configured to sense pressure and vacuum conditions in vapor space 140 of fuel tank 14. Air/vapor flow regulator 112 in flow controller 111 provides means for allowing ambient air 100 flowing from atmosphere 17 through canister 16 to pass through first and second roll-over valves 131, 132 into vapor space 140 whenever a vacuum extant in fuel tank vapor space 140 exceeds a predetermined vacuum level as suggested, for example, in FIG. 4. Air/vapor flow regulator 112 in flow controller 111 also provides means for allowing pressurized fuel vapor 101, 102 (e.g., mixture 103) discharged from fuel tank vapor space 140 to pass through canister conduit 118 to reach canister 16 whenever fuel vapor pressure extant in fuel tank vapor space 140 exceeds a predetermined pressure level as suggested, for example, in FIG. 3, whether tank refueling is taking place or not.

In the embodiment illustrated in FIG. 1, air/vapor flow regulator 112 in flow controller 111 is "shared" with first and second roll-over valves 131, 132. By sharing air/vapor flow regulator 112, the complexity and cost of a fuel vapor management system associated with a fuel tank can be minimized owing, in part, to sharing of a single overfill protection (OFP) system and a single pressure/vacuum-relief system among more than one roll-over valve coupled to a fuel tank.

Air/vapor flow regulator 112 is configured to provide means for blocking discharge of fuel vapor extant in a portion of fluid-conducting passageway 115 located between first roll-over valve 131 and tank port 147 t and pressurized at a magnitude below a predetermined pressure threshold during a fuel tank refueling activity to establish a fuel tank overfill protection system and a fuel tank pressure-relief system so that vapor space 140 of fuel tank 14 associated with flow controller 111 is not vented to fuel vapor recovery canister 116 associated with flow controller 111 via internal space 147s formed in flow-control housing 147 while fuel tank 14 is being filled with liquid fuel unless fuel vapor pressure in fuel tank 14 exceeds a predetermined minimum pressure that is higher than a pressure associated with fuel tank refueling activities. Air/vapor flow regulator 112 is also configured to provide means for allowing flow of air and fuel vapor through internal space 147s formed in flow-control housing 147 between canister and tank ports 147c, 147 t to regulate admission of ambient air from atmosphere 17 into fuel tank 14 through flow-control housing 147 and fluid-conducting passageway 15 when a vacuum characterized by at least a predetermined negative pressure has developed in vapor space 140 of fuel tank 14 associated with flow controller 111 to establish a fuel tank vacuum-relief system.

As suggested in FIG. 2, an illustrative flow controller 111 includes a flow-control housing 147 and air/vapor flow regulator 112 is located and arranged to move about inside flow-control housing 147. In an illustrative embodiment, flow-control housing 147 includes a base 120 formed to include an interior port 152 and a base tube 122 coupled to vent conduit 200 and formed to include a vent passageway 124 terminating at tank port 147 t and providing fluid communication between interior port 152 and vent conduit 200. Flow-control housing 147 also includes a cover 126 coupled to base 120 to form a central vent chamber 144 therebetween. Interior vent port 152 opens into central vent chamber 144. Flow-control housing 147 also includes a cover tube 128 coupled to canister conduit 118 and formed to include a fluid-transfer passageway 146 terminating at canister port 147c and interconnecting central vent chamber 144 and canister conduit 118 in fluid communication. In an illustrative embodiment, central vent chamber 144, vent passageway 124, and fluid-transfer passageway 146 cooperate to define interior space 147s of flow-control housing 147.

As shown in FIG. 2, first and second rings 181, 182 are included in flow-control housing 147 and in central vent chamber 144. First ring 181 surrounds second ring 182 and is concentric with second ring 182 to define an annular space 183 therebetween. First ring 181 forms an annular outer side wall of cover 126 as suggested in FIG. 2. One or more slots 84 are formed in second ring 182 to allow air and vapor flow from interior region 85 defined by second ring 182 and fluid-transfer passageway 146 and canister port 147c provided therein. Air 100 and fuel vapor 101, 102 (e.g., mixture 103) can flow through slots 84 during venting activity as suggested, for example, in FIGS. 3 and 4.

An annular upstanding side wall 186 of base 120 is coupled to a lowermost free end of first ring 181 as suggested in FIG. 2 to surround a floor 197 of central vent chamber 144 included in base 120. Side wall 186 includes a connector 188 formed in side wall 186 to mate with first ring 181. A "snap-fit" connector is illustrated; however, any suitable connector may be used to couple side wall 186 to first ring 181. Floor 197 is arranged to underlie first and second rings 181, 182. Floor 197 is formed to include interior port 152 through which air 100 and fuel vapor 101,102 (e.g. mixture 103) may flow during venting activity as suggested, for example, in FIGS. 3 and 4.

Air/vapor flow regulator 112 comprises a sealing disk 90 and a ball-shaped overfill-protection device 93 as shown, for example, in FIG. 2. A thin round sealing disk 90 is trapped between the lowermost free end of first ring 181 and an upwardly facing annular surface 191 of base 120 to establish a sealed connection between first ring 181 and side wall 186 so as to block flow of air 100 and fuel vapor 101,102 therebetween. In the illustrated embodiment, connector 188 of side wall 186 is used to clamp or otherwise retain an outer edge of sealing disk 90 between first ring 181 and side wall 186 as shown in FIG. 3. Sealing disk 90 is formed to include a vent port 92 of small size to conduct air 100 and fuel vapor 101,102 back and forth as needed between interior port 152 in floor 197 and central vent chamber 144 in flow-control housing 147.

Inside central vent chamber 144 is an overfill-protection "ball" 93 that is arranged to contact an upwardly facing surface of sealing disk 90 normally to close vent port 92 as suggested, for example, in FIG. 2. Overfill-protection ball 93 acts as a "pressure-holding" valve. Normally, overfill-protection ball 93 cooperates with sealing disk 90 to establish a sealed connection therebetween blocking flow of air 100 and fuel vapor 101,102 (e.g., mixture 103) through vent port 92 formed in sealing disk 90. Such blockage occurs during and after tank re-fueling to prevent dissipation of residual tank pressure to fuel vapor recovery canister 16 and atmosphere 17.

Base 120 is formed to include several (e.g., four) radially extending inclined ribs 194 arranged to lie under sealing disk 90 and extend radially inwardly from upwardly facing annular surface 191 and in circumferentially spaced-apart relation to one another as suggested, for example, in FIG. 2. The purpose of these ribs 194 is to prevent sealing disk 190 from moving too far away from overfill-protection ball 93 yet allow enough movement to permit incoming air 100 from atmosphere 17 to pass between sealing disk 90 and overfill-protection ball 93 during high vacuum conditions 202 in fuel tank 14 as suggested in FIG. 4. Ribs 194 are located to maintain a minimum gap between sealing disk 90 and ball 93. This way, with very little flow, there is a pressure drop created across sealing disk 90 which will urge sealing disk 90 into contact with ball 93. If the sealing disk 90 is allowed to move too far away from ball 93, it may be that when there is a following instance of pressure sealing disk 90 may not move to the closed position for a "pressure-hold" function.

As suggested in FIG. 2, overfill-protection ball 93 is supported normally by a pin or post 187 included in base 120 and arranged to extend through vent port 92 so that sealing disk 90 seals against ball 93 during exposure to normal tank pressures created during tank refueling activities. Overfill-protection ball 93 can be lifted upwardly away from pin 187 by pressurized fuel vapor 103 flowing out of fuel tank 14 through flow controller 111 during high pressure conditions 203 as suggested in FIG. 3. Upward movement of sealing disk 90 is limited by engagement with a lowermost portion of ring 182 as suggested in FIG. 3. Downward movement of sealing disk 90 is limited by engagement with upwardly facing inclined surfaces on ribs 194 as suggested in FIG. 4.

Figure 2A:
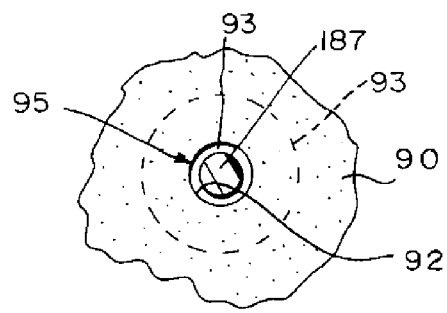
FIG. 2A is a section taken along line 2A-2A showing an annular channel formed between the post and the surrounding inner rim of the sealing disk and closed by the overfill-protection "ball" during normal pressure conditions in the fuel tank and configured to be opened during normal vacuum conditions in the fuel tank.

In the illustrated embodiment, pin 187 is formed to include an upwardly opening cone-shaped cavity 199 facing toward overlying ball 93 and receiving a lowest portion of ball 93 therein to allow ball 93 to rest normally in a stable position on pin 187. As suggested in FIGS. 2 and 2A, an annular channel 95 is formed between the pin 187 and the surrounding inner rim of sealing disk 90 and closed by overfill-protection ball 93 during normal pressure/vacuum conditions 201 in fuel tank 14.

When overfill-protection ball 93 is seated on the portion of sealing disk 90 surrounding vent port 92 during normal pressure/vacuum conditions 201 in fuel tank 14, tank vent system 13, and vent passageway 124, there will be no flow of pressurized fuel vapor 101,102 (e.g., mixture 103) upwardly through vent port 92 (i.e., annular channel 95) into central vent chamber 44 until the fuel vapor pressure below ball 93 is sufficient to lift ball 93 upwardly off pin 187 and sealing disk 90 during high pressure conditions 203 as shown, for example, in FIG. 3. This normal-closure position of ball 93 illustrated in FIG. 2 provides the "pressure holding" function that is used to prevent overfilling of fuel tank 14. Overfill-protection ball 93 normally remains in a port-closing position above vent port 92 as shown in FIG. 2 during and after fuel tank re-fueling. Sealing disk 90 will thus remain normally in the "horizontal" orientation shown in FIG. 2 owing, in part, to "stiffness" of the flexible sealing disk 90 and a "bed" of pressurized fuel vapor underneath sealing disk 90 during normal pressure/vacuum conditions.

In contrast, should there be an unwanted vacuum in fuel tank 14, a central portion of sealing disk 90 will be drawn downwardly in open spaces provided above ribs 94 under a suction force established by a vacuum (e.g., high vacuum conditions 202) extant in vapor space 140 of fuel tank 14 as shown, for example, in FIGS. 1 and 4. In this event, pin 187 will function to support the weight of ball 93. A central portion of sealing disk 90 unsupported by ribs 94 will flex away from ball 93 and allow flow of ambient air 100 from atmosphere 17 past ball 93 and through annular channel 95 associated with vent port 92 and through interior port 152, vent passageway 124, etc., into fuel tank 14 to relieve unwanted vacuum conditions in fuel tank 14. Sealing disk 90 provides a seal with overfill-protection ball 93 for holding tank pressure for overfill protection (OFP) and also provides vacuum relief for fuel tank 14. It functions to allow high air flow in the "vacuum" direction to relieve tank vacuum at lower pressures that can be allowed in the opposite "pressure" direction. Owing to flexing of sealing disk 90 under vacuum-induced suction forces, the orifice size provided by vent port 92 (e.g., annular channel 95) is variable and not fixed.

In another embodiment illustrated, for example, in FIGS. 5-7, an illustrative flow controller 211 includes a flow-control housing 247 and an air/vapor flow regulator 212 located inside a central vent chamber 244 formed in flow-control housing 247. Flow-control housing 247 is formed to include internal space 247s, canister port 247c communicating with internal space 247s, and tank port 247t communicating with internal space 247s. A fluid-conducting passageway 15 is provided to transfer air and fuel vapor between flow controller 211 and fuel tank vapor space 140. Air/vapor flow regulator 212 is suitable for use in many tank venting systems including those systems shown in FIGS. 1 and 11.

In an illustrative embodiment, flow-control housing 247 includes a base 220 formed to include a vent port 252 and a base tube 222 coupled to vent conduit 200 and formed to include a vent passageway 224 terminating at tank port 247t and providing fluid communication between vent port 252 and vent conduit 200. Vent conduit 200 is coupled to tank valve system 13 associated with fuel tank 14. Flow-control housing 247 also includes a cover 226 coupled to base 220 to form a central vent chamber 244 therebetween. Flow-control housing 247 also includes a cover tube 228 coupled to canister conduit 118 and formed to include fluid-transfer passageway 246 terminating at canister port 247c and interconnecting central vent chamber 244 and canister conduit 118 in fluid communication. Base 220 is coupled to cover 226 using any suitable means. Central vent chamber 244, vent passageway 224, and fluid-transfer passageway 246 cooperate to define internal space 247s of flow-control housing 247.

Air/vapor flow regulator 212 comprises a sealing disk 290 and a "thumbtack-shaped" overfill-protection device 293 formed to include a vent-control chamber 204 containing sealing disk 290 as shown in FIGS. 5-7. Sealing disk 290 is thin, round, made of a suitable sealing material, and formed to include a central aperture 291. Overfill-protection device 293 is mounted for movement in central vent chamber 244 of flow-control housing 247 to open and close vent port 252 and tank port 247t communicating with fuel tank 14.

Overfill-protection device 293 includes a downwardly extending tubular stem 205 formed to include a central flow orifice 206 communicating with rent-control chamber 204 and having an opening in a downwardly presented hemispherical sealing surface 207 provided on a free end of tubular stem 205. Overfill-protection device 293 further includes an annular flange 208 appended to a proximal end of tubular stem 205 and formed to include one or more outer flow orifices 209 as shown, for example, in FIG. 5.

Overfill-protection device 293 also includes a lid 210 arranged to overlie and be coupled to annular flange 208. Lid 210 and annular flange 208 cooperate to form vent-control chamber 204 and place vent-control chamber 204 "between" and in fluid communication with outer flow orifice(s) 209 and central flow orifice 206. In the illustrated embodiment, lid 210 includes a round top wall 210a and an annular side wall 210b depending from a perimeter edge of round top wall 210a. Sealing disk 290 is interposed between annular flange 208 and top wall 210a as suggested in FIGS. 5-7. Annular side wall 210b is configured to grip an underside portion of annular flange 208 to provide means for retaining lid 210 in a fixed position on annular flange 208 as suggested in FIGS. 5-7.

As suggested in FIG. 5, overfill-protection device 293 is a two-part device comprising a lid 210 and a lid support including an annular flange 208 and a downwardly extending tubular stem 205 terminating at a hemispherical sealing surface 207. Overfill-protection device 293 has a T-shaped cross section as shown, for example, in FIG. 5. One or more stem guide posts 220a are appended to an interior surface of base 220 and arranged to extend upwardly toward lid 210 and to provide means for guiding movement of tubular stem 205 toward and away from base 220. Base 220 is formed to include frusto-conical seat 251 for providing an opening into vent port 252 and mating with hemispherical sealing surface 207 to establish a sealed connection therebetween as suggested, for example, in FIGS. 5 and 7.

Inside central vent chamber 244 in flow-control housing 247 is an overfill-protection device 293 that cooperates with sealing disk 290 normally to "close" vent port 252 to block flow of air 100 and fuel vapor 101, 102 (e.g., mixture 103) between fuel tank 14 and fuel vapor recovery canister 16 through vent port 252 into and through central vent chamber 244, fluid-transfer passageway 246, and canister conduit 118. Such blockage occurs during and after tank refueling to prevent dissipation of residual tank pressure to fuel vapor recovery canister 16 and atmosphere 17.

As shown in FIG. 5, when tubular stem 205 of overfill-protection device 293 is seated on frustoconical seat 251 formed in base 220, there will be no flow of pressurized fuel vapor 101, 102 (e.g., mixture 103) upwardly through vent port 252 into central vent chamber 244 owing to movement of sealing disk 290 to assume an orifice-closing position on chamber floor 299 of vent control chamber 204 closing outer flow orifice(s) 209 formed in annular flange 208. Any pressurized fuel vapor 103 extant in vent conduit 200 is free to pass through vent passageway 224 in base tube 222, vent port 252, central flow orifice 206 in tubular stem 205, and central aperture 291 formed in sealing disk 290 to reach the portion of vent-control chamber 204 above sealing disk 290 and below top wall 210a of lid 210. This pressurized fuel vapor 103 exerts a downward closing force "$F_{CLOSE}$" on sealing disk 290 to retain that disk in the orifice-closing position shown in FIG. 5.

The normal closure of vent port 252 in base 220 shown in FIG. 5 provides the "pressure-holding" function that is used to prevent overfilling of fuel tank 14. Overfill-protection device 293 normally remains in a port-closing position as shown in FIG. 5 during and after refueling.

Sealing disk 290 will remain in the orifice-closing position as shown in FIG. 5 until the fuel vapor pressure extant in vent port 252 below exposed portions of tubular stem 205 is sufficient to lift tubular stem 205 upwardly off frustoconical seat 251 during, for example, high pressure conditions 203 as shown in FIG. 6. During such high pressure conditions 203, high pressure fuel vapor 103 vents from fuel tank 14 to fuel vapor recover canister 16 through flow controller 211 as shown in FIG. 6.

In contrast, should there be an unwanted vacuum in fuel tank 14, tubular stem 205 of overfill-protection device 293 is drawn downwardly to engage frustoconical seat 251 and any negative pressure from fuel tank 14 in vent conduit 200, vent passageway 224, and central flow aperture 206 is transferred through central aperture 291 in sealing disk 290 and exerts an upward opening force "$F_{OPEN}$" applied to the upwardly facing surface of sealing disk 290. This suction force lifts sealing disk 290 upwardly as suggested diagrammatically in FIG. 7 to allow air 100 to flow from fuel vapor recovery canister 16 underneath sealing disk 290 in vent-control chamber 204 through flow controller 211 to reach fuel tank 14.

In yet another embodiment illustrated, for example, in FIGS. 8-10, an illustrative flow controller 311 includes a flow-control housing 247 and an air/vapor flow regulator 312 located inside a central vent chamber 244 formed in flow-control housing 247. Flow-control housing 247 is formed to include internal space 247s, canister port 247c communicating with internal space 247s, and tank port 247t communicating with internal space 247s. A fluid-conducting passageway 15 is provided to transfer air and fuel vapor between flow controller 311 and fuel tank vapor space 140. Air/vapor flow regulator 312 is suitable for use in many tank venting systems including those systems shown in FIGS. 1 and 11.

Air/vapor flow regulator 312 comprises a sealing disk 390 and a "thumbtack-shaped" overfill-protection device 393 formed to include a vent-control chamber 304 containing sealing disk 390 as shown in FIGS. 8-10. Sealing disk 390 is thin, round, made of a suitable sealing material, and formed to include a pair of apertures 391a and 391b. Overfill-protection device 393 is mounted for movement in central vent chamber 244 of flow-control housing 247 to open and close vent port 252 communicating with fuel tank 14.

Overfill-protection device 393 includes a downwardly extending tubular stem 305 formed to include a central flow orifice 306 communicating with vent-control chamber 304 and having an opening in a downwardly presented hemispherical sealing surface 307 provided on a free end of tubular stem 305. Overfill-protection device 393 further includes an annular flange 308 appended to a proximal end of tubular stem 305 as shown, for example, in FIG. 8.

Overfill-protection device 393 also includes a lid 310 arranged to overlie and be coupled to annular flange 208. Lid 310 and annular flange 208 cooperate to form vent-control chamber 304 and place vent control chamber 304 "between" and in fluid communication with outer flow orifice(s) 309 formed in lid 310 and central flow orifice 206. In the illustrated embodiment, lid 310 includes a round top wall 310a formed to include one or more outer flow orifices 309 and an annular side wall 310b depending from a perimeter edge of round top wall 10a. Sealing disk 390 is interposed between annular flange 308 and top wall 310a as suggested in FIGS. 8-10. Annular side wall 310b is configured to grip an underside portion of annular flange 308 to provide means for retaining lid 310 in a fixed position on annular flange 308 as suggested in FIGS. 8-10.

As suggested in FIG. 8, overfill-protection device 393 is a two-part device comprising a lid 310 and a lid support including an annular flange 308 and a downwardly extending tubular stem 305 terminating at a hemispherical sealing surface 307. Overfill-protection device 393 has a T-shaped cross section as shown, for example, in FIG. 8. One or more stem guide posts 220a are appended to an interior surface of base 220 and arranged to extend upwardly toward lid 310 and to provide means for guiding movement of tubular stem 305 toward and away from base 220. Base 220 is formed to include frustoconical seat 251 for providing an opening into vent port 252 and mating with hemispherical sealing surface 307 to establish a sealed connection therebetween as suggested, for example, in FIGS. 8 and 10.

Inside central vent chamber 244 in flow-control housing 247 is an overfill-protection device 393 that cooperates with sealing disk 390 normally to "close" vent port 252 to block flow of air 100 and fuel vapor 101, 102 (e.g., mixture 103) between fuel tank 14 and fuel vapor recovery canister 16 through vent port 252 into and through central vent chamber 244, fluid-transfer passageway 246, and canister conduit 118. Such blockage occurs during and after tank refueling to prevent dissipation of residual tank pressure to fuel vapor recovery canister 16 and atmosphere 17.

As shown in FIG. 8, when tubular stem 305 of overfill-protection device 393 is seated on frustoconical seat 251 formed in base 220, there will be no flow of pressurized fuel vapor 101, 102 (e.g., mixture 103) upwardly through vent port 252 into central vent chamber 244 owing to movement of sealing disk 390 to assume an orifice-closing position on chamber ceiling 398 (away from chamber floor 399) of vent-control chamber 304 closing outer flow orifice(s) 309 formed in top wall 310a of lid 310. Any pressurized fuel vapor 103 extant in vent conduit 200 is free to pass through vent passageway 224 in base tube 222, vent port 252, central flow orifice 306 in tubular stem 305 to reach the portion of vent-control chamber 304 under disk 390 and above chamber floor 399. This pressurized fuel vapor 103 exerts an upward closing force "$F_{CLOSE}$" on sealing disk 390 to retain that disk in the orifice-closing position shown in FIG. 8.

The normal closure of vent port 252 in base 220 shown in FIG. 8 provides the "pressure-holding" function that is used to prevent overfilling of fuel tank 14. Overfill-protection device 393 normally remains in a port-closing position as shown in FIG. 8 during and after refueling.

Sealing disk 390 will remain in the orifice-closing position as shown in FIG. 8 until the fuel vapor pressure extant in vent port 252 below exposed portion of tubular stem 305 is sufficient to lift tubular stem 305 upwardly off frustoconical seat 251 during, for example, high pressure conditions 203 as shown in FIG. 9. During such high pressure conditions 203, high pressure fuel vapor 103 vents from fuel tank 14 to fuel vapor recover canister 16 through flow controller 311 as shown in FIG. 9.

In contrast, should there be an unwanted vacuum in fuel tank 14, tubular stem 305 is drawn downwardly to engage frustoconical seat 251 and any negative pressure from fuel tank 14 in vent conduit 2001 vent passageway 224, and central flow aperture 306 exerts a downward opening force "$F_{OPEN}$" applied to the downwardly facing surface of sealing disk 390. This suction force pulls sealing disk 390 downwardly as suggested diagrammatically in FIG. 10 to allow air 100 to flow from fuel vapor recovery canister 16 through flow controller 311 to reach fuel tank 14.

A tank venting system 10 in accordance with a second embodiment of the present disclosure includes an air/vapor flow regulator 12 arranged to regulate air and fuel vapor flow between one or more fuel tank vent units 21, 22, 23 associated with a fuel tank 14 and a fuel vapor recovery canister 16 as suggested, for example, in FIG. 11. Air/vapor flow regulator 12 is shared by all vent units 21, 22, 23 even though it is located inside first fuel tank vent unit 21.

In an illustrative embodiment shown in FIG. 11, first and second fuel tank vent units 21, 22 are coupled to fuel tank 14, fuel vapor recovery canister 16 is coupled to first fuel tank vent unit 21 by a canister conduit 18, and air/vapor flow regulator 12 is located in first fuel tank vent unit 21 and regulates flow of air and fuel vapor between both of first and second fuel tank vent units 21, 22. One or more auxiliary vent units such as vent unit 23 can also be coupled to first fuel tank vent unit 21 and fuel tank 14 in the same manner as second fuel tank vent unit 22. Vent unit conduit 20 is provided to conduct fuel vapor discharged from second fuel tank vent unit 22 to first fuel tank vent unit 21. In an illustrative embodiment, air/vapor flow regulator 12 performs a fuel tank overfill-protection function and tank pressure-relief and vacuum-relief functions.

As shown diagrammatically in FIG. 11, fuel tank 14 includes an interior region containing liquid fuel 24 and a vapor space 26 is provided in that interior region above liquid fuel 24 and below a top wall 28 of fuel tank 14. A filler neck 30 is coupled to fuel tank 14 and formed to include an inlet 32 sized to receive a fuel-dispensing pump nozzle 34 coupled to a fuel supply 35.

Illustratively, each fuel tank vent unit 21, 22, 23 contains a roll-over valve and is mounted in a different "location" on fuel tank 14 to allow discharge of pressurized fuel vapor from an interior region of fuel tank 14 that is associated with that roll-over valve location as long as the roll-over valve remains "upright." However, it is desirable to "disable" fuel vapor venting from each vent unit 21 22, 23 during and after fuel tank re-fueling to preserve any residual pressure in fuel tank 14. Such residual pressure tends to form a pressure "barrier" that limits admission of liquid fuel into fuel tank 14 during tank re-fueling after the tank has already been filled to its maximum capacity.

In the embodiment illustrated in FIGS. 11-15, air/vapor flow regulator 12 (located in first fuel tank vent unit 21) blocks fuel vapor discharge to the atmosphere from first fuel tank vent unit 21, and, as a result of a sharing arrangement, also blocks fuel vapor discharge to the atmosphere from second and third fuel tank vent units 22, 23 coupled to first fuel tank vent unit 21. This vent-blocking action prevents dissipation of residual fuel vapor pressure in vapor space 26 through vent units 21, 22, 23 after fuel tank re-fueling has been completed.

In illustrative embodiments, first fuel tank vent unit 21 is mounted to extend through a first aperture 36 formed in top wall 28 of fuel tank 14 to communicate with vapor space 26 as suggested in FIG. 11. Likewise, second fuel tank vent unit 22 is mounted to extend through a second aperture 38 formed in top wall 28 of fuel tank 14 to communicate with vapor space 26.

As suggested in FIG. 11, fuel vapor 102 discharged from fuel tank 14 through second fuel tank vent unit 22 is discharged into first fuel tank vent unit 21 via vent conduit 20. Fuel vapor 101 flowing into first fuel tank vent unit 21 through aperture 36 combines with fuel vapor 102 discharged through vent unit conduit 20 into first fuel tank vent unit 21 to produce a fuel vapor mixture 103 that is delivered to air/vapor flow regulator 12 as suggested diagrammatically in FIG. 11. During and after tank re-fueling, air/vapor flow regulator 12 blocks discharge of fuel vapor mixture 103 to fuel vapor recovery canister 16 (and atmosphere 17) and thus maintains any residual pressure extant in vapor space 26 of fuel tank 14 after fuel tank 14 has been filled with fuel to its capacity. Such residual pressure in vapor space 26 makes it harder for a pump nozzle operator to add more liquid fuel 24 into fuel tank 14 by pumping such flow slowly and sporadically in a practice known as "trickle fill."

Air/vapor flow regulator 12 located in first fuel tank vent unit 21 is configured to sense pressure and vacuum conditions in vapor space 26. Air/vapor flow regulator 12 provides means for allowing ambient air 100 flowing from atmosphere 17 through canister 16 to pass through first and second fuel tank vent units 21, 22 into vapor space 26 whenever a vacuum extant in vapor space 26 exceeds a predetermined vacuum level. Air/vapor flow regulator 12 also provides means for allowing pressurized fuel vapor 101, 102 (e.g., mixture 103) discharged from vapor space 26 to pass through canister conduit 18 to reach canister 16 whenever fuel vapor pressure extant in vapor space 26 exceeds a predetermined pressure level whether tank re-fueling is taking place or not.

In illustrative embodiments, first fuel tank vent unit 21 includes a roll-over valve 40 arranged in a vent passageway provided between vapor space 26 and air/vapor flow regulator 12 as suggested diagrammatically in FIG. 11 and illustratively in FIG. 12. It is within the scope of this disclosure to include a roll-over valve 40 in each of vent units 21, 22, 23. Roll-over valve 40 is configured to block discharge of fuel vapor 101, 102 (e.g., mixture 103) and liquid fuel 24 from fuel tank 14 to air/vapor flow regulator 12 whenever roll-over valve 40 is "inverted" or at least tilted a selected number of degrees (e.g., about 15° to about 90°) from its normal upright position.

Referring now to FIG. 12, an illustrative example of a tank venting system 10 including a first fuel tank vent unit 21 containing an air/vapor flow regulator 12 that is "shared" with a second fuel tank vent unit 22 (and one or more other vent units 23) is shown. By sharing air/vapor flow regulator 12, the complexity and cost of a fuel vapor management system associated with a fuel tank can be minimized owing, in part, to sharing of a single overfill protection (OFP) system and a single pressure/vacuum-relief system among more than one roll-over valve or other fuel vapor vent unit coupled to a fuel tank.

As suggested in FIG. 12, first fuel tank vent unit 21 includes roll-over valve 40 and a valve mount 42 including a flow controller 11 and a mount ring 45 coupled to flow controller 11 and adapted to mate with top wall 28 of fuel tank 14. Flow controller 11 includes a flow-control housing 47 coupled to mount ring 45 and formed to include a central vent chamber 44 containing air/vapor flow regulator 12, a first fluid-transfer passageway 46 interconnecting central vent chamber 44 and canister conduit 18 in fluid communication, and a second fluid-transfer passageway 48 interconnecting central vent chamber 44 and vent unit conduit 20 in fluid communication. Mount ring 45 is configured to be mated to top wall 28 of fuel tank 14, as shown, for example, in FIG. 12, to retain roll-over valve 40 in a position in first aperture 36 and in fluid communication with vapor space 26 formed in fuel tank 14 and retain flow-control housing 47 in fixed relation to underlying roll-over valve 40. In an illustrative embodiment, valve mount 42 is a monolithic component made of a plastics material, such as high density polyethylene, which material can be welded to top wall 28 of fuel tank 14.

Roll-over valve 40 includes a housing 50 having a ceiling 49 formed to include an annular valve seat 51 defining a vent port 52 providing a passageway for communicating air 100 and fuel vapor 101 between an interior region 53 of housing 50 and central vent chamber 44 as illustrated in FIG. 12. Housing 50 also is formed to include ports 54 providing openings from interior region 53 into vapor space 26. Roll-over valve 40 further includes a buoyant float 55 located in interior region 53, a compression spring 56 interposed between float 55 and a floor 57 of housing 50 and configured to provide means for lifting float 55 away from floor 57 during a vehicle rollover or tilting event, and a vent closure 58 for closing and re-opening vent port 52.

Closure 58 includes a closure disk 60, a short first pry-open finger 61 coupled to closure disk 60 and arranged to extend downwardly toward housing floor 57, and a relatively longer second pry-open finger 62 coupled to closure disk 60 and arranged to extend downwardly toward housing floor 57 in spaced-apart relation to the shorter first pry-open finger 61 as suggested in FIG. 12. During a vehicle rollover or tilting event, float 55 urged by spring 56 moves vent closure 58 toward housing ceiling 49 to cause closure disk 60 to mate with annular valve seat 51 and close vent port 52 so that liquid fuel 25 in fuel tank 14 cannot escape from fuel tank 14 through first fuel tank vent unit 21. The buoyancy of float 55 aided by a closure-inducing force provided by spring 56 cooperate to move closure disk 60 to mate with valve seat 51 to close vent port 52 during excessive tilting of roll-over valve 40. During vehicle rollover; however, the closure-inducing force provided by spring 56 is greater than an opposing buoyance force applied to float 55 by liquid fuel in interior region 53 of housing 50 and thus spring 56 is strong enough to move float 55 toward valve seat 51 to mate closure disk 60 with valve seat 51 when interior region 53 is filled with liquid fuel 24.

Float 55 includes a lower portion 62 coupled to spring 56 and an upper portion 63 extending upwardly from lower portion 62 toward annular valve seat 51 as suggested in FIG. 12. Upper portion 63 includes an upstanding post 64 carrying a radially outwardly extending annular rim 65. Upper portion 63 also includes an upwardly extending protuberance 66 terminating at a rounded nose 67.

Vent closure 58 further includes a concave surface 68 provided on an underside of closure disk 60 and arranged to contact rounded nose 67 of protuberance 66 when roll-over valve 40 is "upright" as shown in FIG. 12. First pry-open finger 61 has a first length 161 and second pry-open finger 62 has a longer second length 162. A radially inwardly extending first pry flange 71 is included in a lower portion of first pry-open finger 61 and a radially inwardly extending second pry flange 72 is included in a lower portion of second pry-open finger 62 as shown, for example, in FIG. 12.

When a roll-over valve 40 is "righted" following a rollover or tilting incident, float 55 begins to move downwardly away from housing ceiling 49 and toward housing floor 57. During such motion, one part of rim 65 will first engage the first pry flange 71 to "pull" one portion of closure disk 60 away from mating, sealing engagement with valve seat 51 in a first disk-separation stage and then another part of rim 65 will engage the longer second pry flange 72 to "pull" another portion of closure disk 60 away from mating, sealing engagement with valve seat 51 in a later second disk-separation stage. This two-stage action helps to "re-open" vent port 52 following a rollover or tilting event. In illustrative embodiments, a single part provides closure disk 60 and both pry-open fingers 61, 62 and float protuberance 66 (and its rounded nose 67) centralizes a "closing" force of float 55 as it moves vent closure 58 to mate with valve seat 51 and close vent port 52.

As shown in FIG. 12, first and second rings 81, 82 are included in flow-control housing 47 of valve mount 42 and in central vent chamber 44. First ring 81 surrounds second ring 82 and is concentric with second ring 82 to define an annular space 83 therebetween. One or more slots 84 are formed in second ring 82 to allow air and vapor flow from interior region 85 defined by second ring 82 and canister passageway 46 terminating at a canister port 47c. Air 100 and fuel vapor 101, 102 (e.g., mixture 103) can flow through slots 84 during venting activity as suggested, for example, in FIGS. 14 and 15.

Figure 13:
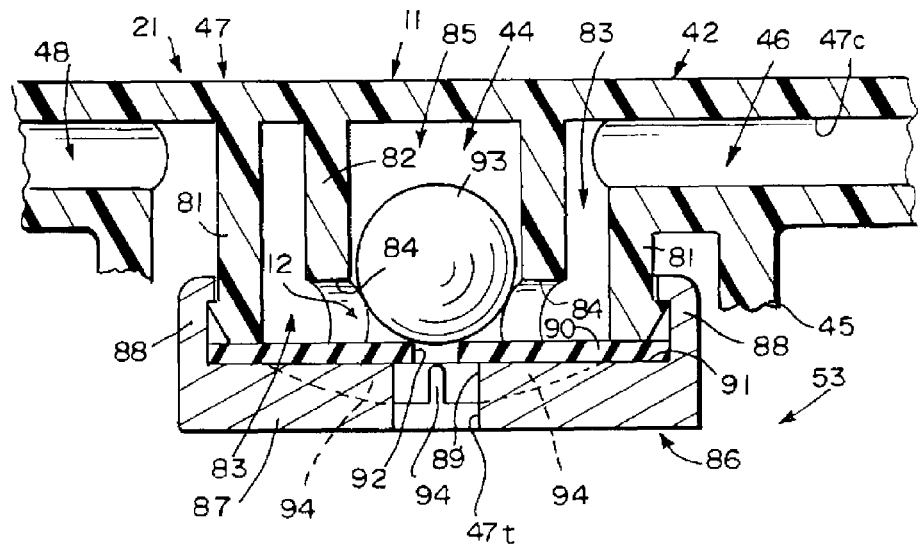
FIGS. 13-15 are enlarged transverse sectional views of an illustrative flow controller adopted to be used in a fuel tank venting system showing a fourth embodiment of an air/vapor flow regulator including a "ball-shaped" overfill-protection device movable to open and close a vent port formed in a sealing disk supporting the ball-shaped overfill protection device and resting on underlying radially extending ribs.

A retainer or base 86 is included in flow-control housing 47 and coupled to a lowermost free end of first ring 81 as suggested in FIG. 13 to define a floor 87 of central vent chamber 44 that is arranged to underlie first and second rings 81, 82. Retainer 86 includes a connector 88 arranged to extend upwardly from a perimeter portion of floor 87 to mate with first ring 81. A "snap-fit" connector is illustrated; however, any suitable connector may be used to couple retainer 86 to first ring 81. Floor 87 is formed to include a central port 89 terminating at a tank port 47t through which air 100 and fuel vapor 101,102 (e.g. mixture 103) may flow during venting activity as suggested, for example, in FIGS. 14 and 15.

A thin round sealing disk 90 is trapped between the lowermost free end of first ring 81 and an upwardly facing surface 91 of floor 87 to establish a sealed connection between first ring 81 and retainer 86 so as to block flow of air and fuel vapor 101,102 therebetween. In the illustrated embodiment, connector 88 of retainer 86 is used to clamp an outer edge of sealing disk 90 between first ring 81 and retainer floor 87 as shown in FIG. 13. Sealing disk 90 is formed to include a vent port 92 of small size to conduct air 100 and fuel vapor 101,102 back and forth as needed between central port 89 in floor 87 and central vent chamber 44.

Inside central vent chamber 44 is an overfill-protection ball 93 that acts as a pressure holding valve and is arranged to rest normally on an upwardly facing surface of sealing disk 90 to close vent port 92. Normally, overfill-protection ball 93 cooperates with sealing disk 90 to establish a sealed connection therebetween blocking flow of air 100 and fuel vapor 101,102 (e.g., mixture 103) through vent port 92 formed in sealing disk 90. Such blockage occurs during and after tank re-fueling to prevent dissipation of residual tank pressure to fuel vapor recovery canister 16 and atmosphere 17.

Retainer 86 is formed to include several (e.g., four) radially extending ribs 94 arranged to lie under sealing disk 90 and extend radially outwardly from central port 89 and in circumferentially spaced-apart relation as suggested, for example, in FIG. 13. Thus, an air and fuel vapor flow channel is formed in the space between each adjacent pair of radially extending ribs 94. Each rib 94 extends radially inwardly and terminates at a point that is near and just short of the boundary edge of vent port 92 formed in sealing disk 90.

Figure 14:
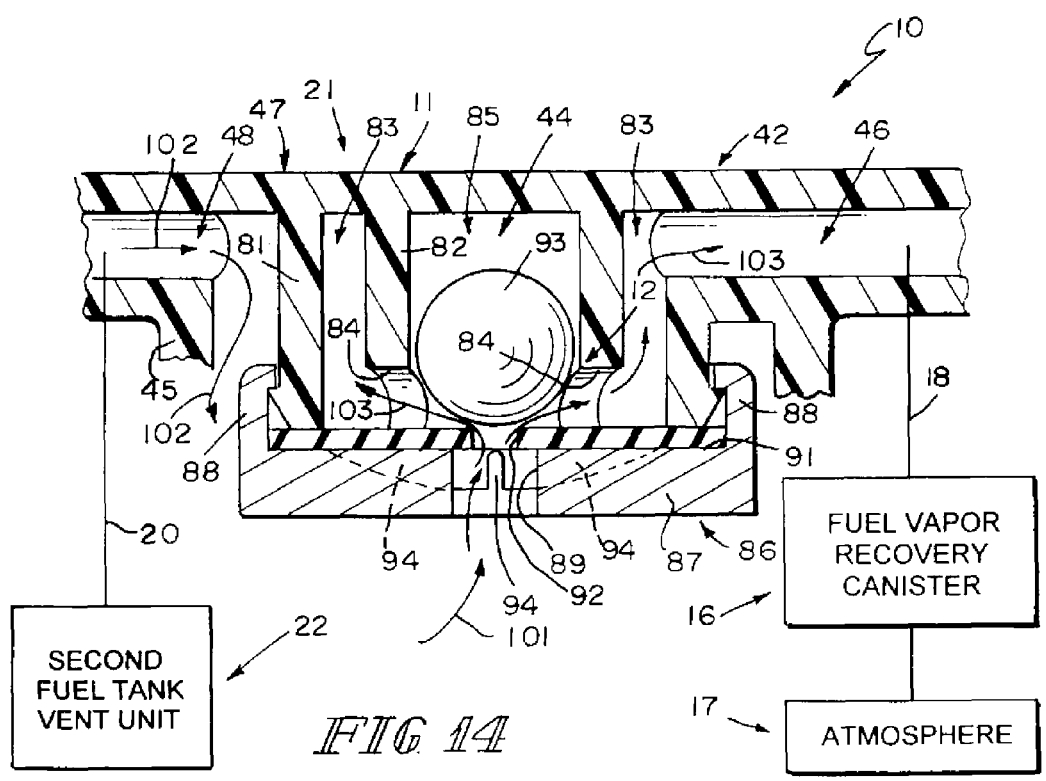

When overfill-protection ball 93 is seated on the portion of sealing disk 90 surrounding vent port 92, there will be no flow of pressurized fuel vapor 101,102 (e.g., mixture 103) upwardly through vent port 92 into central vent chamber 44 until the pressure below ball 93 is sufficient to lift ball 93 upwardly off sealing disk 90 as shown, for example, in FIG. 14. This provides the "pressure holding" function that is used to prevent overfilling of fuel tank 14. Overfill-protection ball 93 normally remains in a port-closing position above vent port 92 during and after fuel tank re-fueling.

Figure 15:
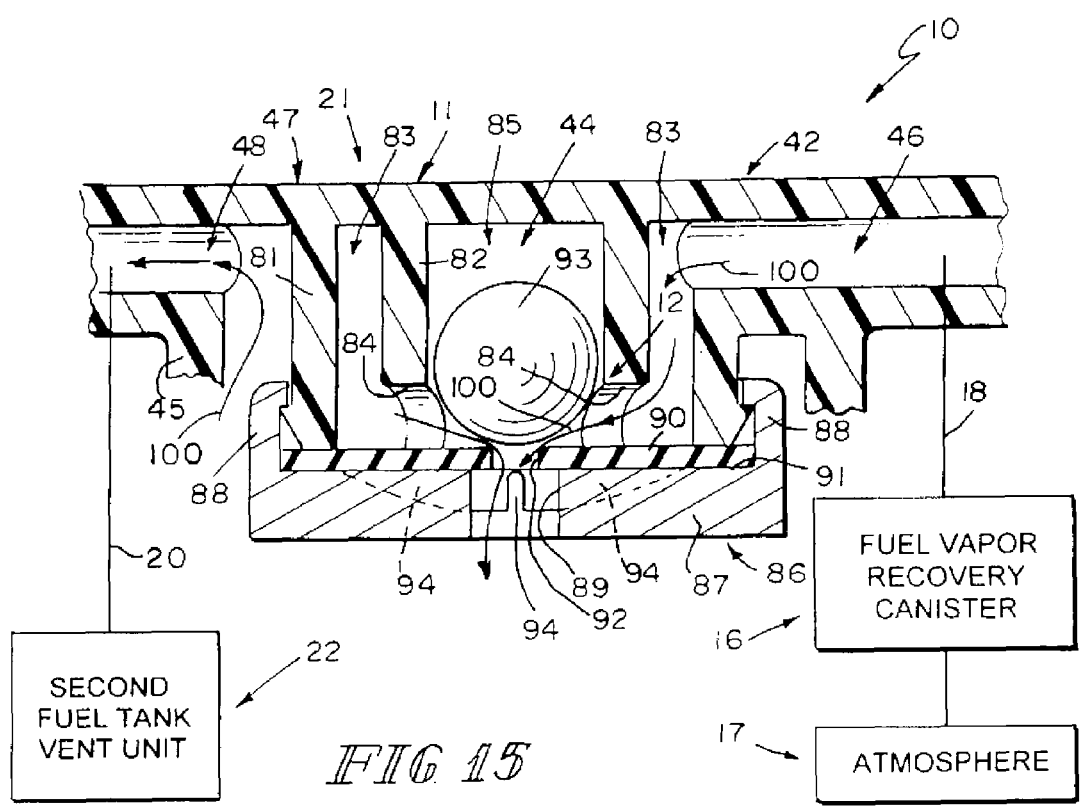

In contrast, should there be an unwanted vacuum in fuel tank 14, a central portion of sealing disk 90 will be drawn downwardly in open spaces provided between each pair of adjacent ribs 94 under a suction force established by a vacuum extant in vapor space 26 of fuel tank 14 as shown, for example, in FIG. 15. In this event, ribs 94 will cooperate to support the weight of ball 93. Sections of sealing disk 90 unsupported by ribs 94 will flex away from ball 93 and allow flow of ambient air 100 past ball 93 and through ports 92, 89 into fuel tank 14 to relieve unwanted vacuum conditions in fuel tank 14. Sealing disk 90 provides a seal with overfill-protection ball 93 for holding tank pressure for overfill protection (OFP) and also provides vacuum relief for fuel tank 14. It functions to allow high air flow in the "vacuum" direction to relieve tank vacuum at lower pressures that can be allowed in the opposite "pressure" direction. Owing to flexing of sealing disk 90 under vacuum-induced suction forces, the orifice size provided by vent port 92 is variable and not fixed.

As shown in FIG. 13, no fuel vapor mixture 103 is allowed to flow from fuel tank 14 through vent passageway 53, 89, 92, 85, 84, 83, 44, 46 toward fuel vapor recovery canister 16 because overfill-protection ball 93 is at rest on sealing disk 90 closing vent port 92. Fuel vapor mixture 103 is a combination of fuel vapor 101 discharged from fuel tank 14 by first fuel tank vent unit 21, fuel vapor 102 discharged from fuel tank 14 by second fuel tank vent unit 22, and any fuel vapor discharged from fuel tank 14 by one or more other vent units 23. Thus, each of vent units 21, 22, 23 share one overfill protection system provided by air/vapor flow regulator 12 located in first vent unit 21. Whether during or after tank re-fueling, if tank pressure exceeds a predetermined maximum level, such pressure will lift overfill protection ball 93 off sealing disk 90 to open vent port 92 to vent excess pressurized fuel vapor 103 to fuel vapor recovery canister 16.

As shown in FIG. 15, a portion of sealing disk 90 surrounding vent port 92 flexes and moves away from overfill protection ball 93, under a suction force generated by excess vacuum in fuel tank 14. This movements opens a flow path between ball 93 and sealing disk 90 to allow ambient air 100 to flow through vent passageway 53, 89, 92, 85, 84, 83, 44, 46 into fuel tank 14.

Figure 16:
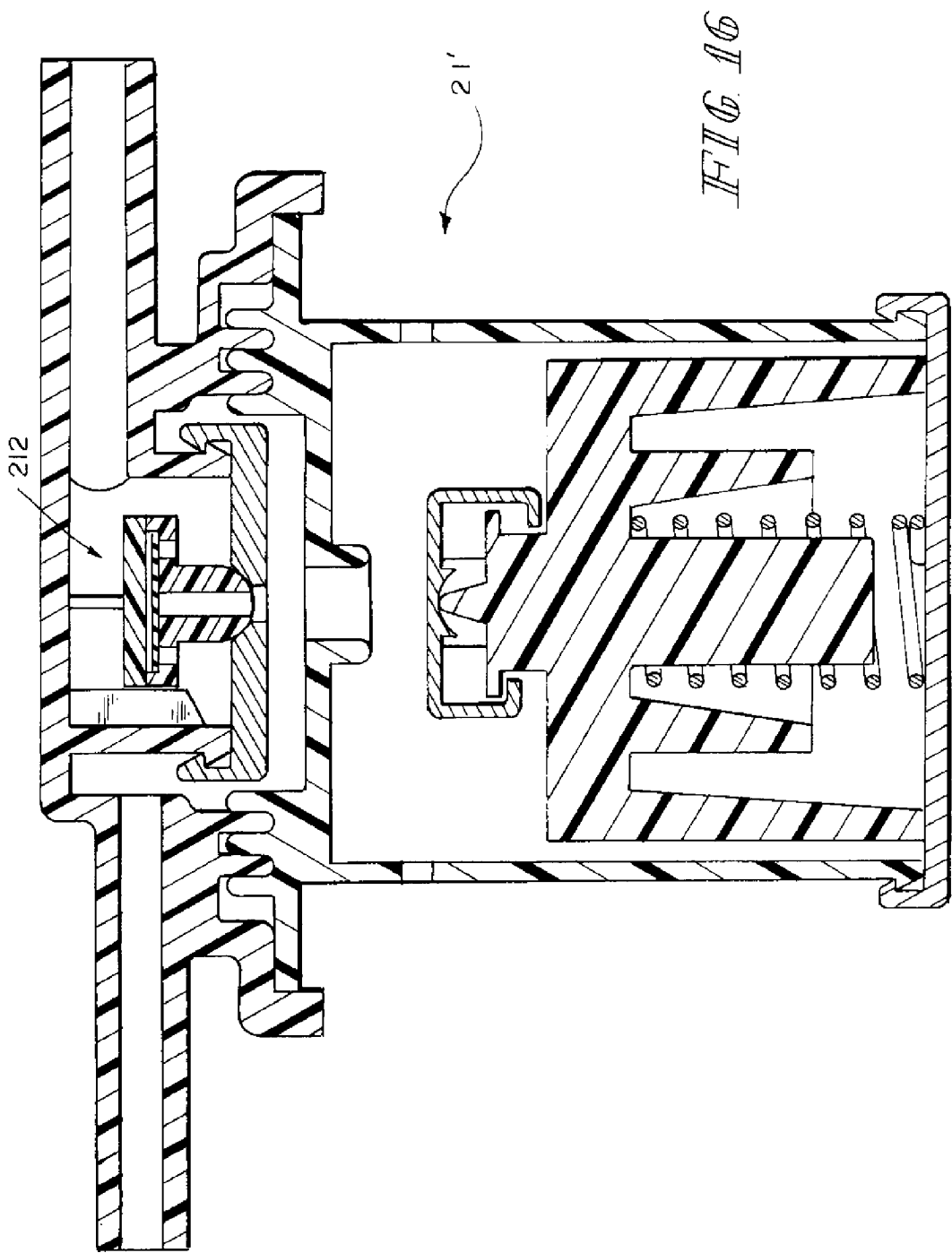
FIG. 16 is a transverse sectional view that is similar to FIG. 12 and shows another embodiment of the first fuel tank vent unit of FIG. 11 configured to include an air/vapor flow regulator of the type shown, for example, in FIGS. 5-7.

FIG. 16 is a transverse sectional view that is similar to FIG. 12 and shows another embodiment 21' of the first fuel tank vent unit 21 of FIG. 11 configured to include an air/vapor flow regulator 212 of the type shown, for example, in FIGS. 5-7. FIG. 17 is a view similar to FIG. 16 showing yet another embodiment of a fuel tank vent unit 121 in accordance with the present disclosure, which vent unit 121 includes an air/vapor flow regulator 212 of the type shown, for example, in FIGS. 5-7.

The invention claimed is:

1. A tank venting system comprising
a flow controller including a flow-control housing formed to include an internal space and an air/vapor flow regulator located in the internal space of the flow-control housing, the flow-control housing also being formed to include a tank port opening into the internal space and a canister port opening into the internal space and being adapted to communicate air and fuel vapor to and from the internal space and a fuel vapor recovery canister associated with the flow controller, and
a tank valve system coupled to the tank port foamed in the flow-control housing and adapted to communicate air and fuel vapor to and from the internal space in the flow-control housing and a vapor space in a fuel tank associated with the flow controller, the tank valve system comprising a fluid-conducting passageway communicating with the tank port and the vapor space in the fuel tank and a first roll-over valve configured to provide means in the fluid-conducting passageway for blocking flow of pressurized fuel vapor discharged from the vapor space of the fuel tank through the fluid-conducting passageway and the tank port to the internal space formed in the flow-control housing whenever the first roll-over valve is tilted at least a selected number of degrees from a normal upright position so that fuel vapor from the vapor space of the fuel tank is unable to flow through the fluid-conducting passageway to reach the internal space of the flow-control housing, and
wherein the air/vapor flow regulator is configured to provide means for blocking discharge of fuel vapor extant in a portion of the fluid-conducting passageway located between the first roll-over valve and the tank port and pressurized at a magnitude below a predetermined pressure threshold during a fuel tank refueling activity to establish a fuel tank overfill protection system and a fuel tank pressure-relief system so that the vapor space of the fuel tank associated with the flow controller is not vented to the fuel vapor recovery canister associated with the flow controller via the internal space formed in the flow-control housing while the fuel tank is being filled with liquid fuel unless fuel vapor pressure in the fuel tank exceeds a predetermined minimum pressure that is higher than a pressure associated with fuel tank refueling activities and for allowing flow of air and fuel vapor through the internal space formed in the flow-control housing between the canister and tank ports to regulate admission of ambient air from the atmosphere into the fuel tank through the flow-control housing and the fluid-conducting passageway when a vacuum characterized by at least a predetermined negative pressure has developed in the vapor space of the fuel tank associated with the flow controller to establish a fuel tank vacuum-relief system.

2. The tank venting system of claim 1, wherein the tank valve system further includes a second roll-over valve configured to provide means in the fluid-conducting passageway for blocking flow of pressurized fuel vapor discharged from the vapor space of the fuel tank through the fluid-conducting passageway and the tank port to the internal space formed in the flow-control housing whenever the second roll-over valve is tilted at least a selected number of degrees from a normal upright position so that fuel vapor from the vapor space of the fuel tank is unable to flow through the fluid-conducting passageway to reach the internal space of the flow-control housing and wherein the fluid-conducting passageway includes a regulator branch coupled to the tank port, a first branch coupled to the regulator branch at a junction and to the first roll-over valve, and a second branch coupled to the regulator branch at the junction and to the second roll-over valve to cause fuel vapor discharged from the first roll-over valve into the first branch to merge in the regulator branch with fuel vapor discharged from the second roll-over valve and flow through the tank port into the internal space formed in the flow-control housing to reach the air/vapor regulator located in the internal space.

3. The tank venting system of claim 1, wherein the air/vapor flow regulator includes a sealing disk having an inner rim defining a vent port and an overfill-protection device supported above the sealing disk on a post extending into the vent port to mate the overfill-protection device with the inner rim normally to block flow of air and fuel vapor through the vent port during normal pressure/vacuum conditions to establish the fuel tank overfill protection system and wherein the overfill-protection device is configured to be lifted off the post to allow flow of pressurized fuel vapor from the fluid-conducting passageway through the internal space of the flow-control housing and out of the flow-control housing through the canister port upon exposure to pressurized fuel vapor flowing into the internal space through the tank port and through the vent port whenever the pressure of fuel vapor extant in the fuel tank exceeds a predetermined minimum pressure to establish the fuel tank pressure-relief system and wherein the sealing disk is made of a deformable material and configured to deform and unmate from the overfill-protection device to allow flow of atmospheric air admitted into the internal space of the flow-control housing through the canister port through the vent port and the tank port into the fluid-conducting passageway upon exposure to negative pressure extant in the vent port whenever a vacuum in the vapor space of the fuel tank has a magnitude that is greater than a predetermined subatmospheric level to establish the fuel tank vacuum-relief system.

4. The tank venting system of claim 3, wherein the flow-control housing includes a base formed to include the tank port, a cover formed to include the canister port and a first ring and coupled to the base to form a central vent chamber therebetween defining a portion of the internal space, and a second ring coupled to the cover and located in the central vent chamber, the first ring surrounds the second ring and is concentric with the second ring to define an annular space therebetween, the first ring forms an annular outer side wall of the cover, at least one slot is formed in the second ring to allow flow of air and fuel vapor from an interior region defined by the second ring to the canister port, the sealing disk is trapped between a lowermost free end of the first ring on a side wall of the base to establish a sealed connection therebetween, the base includes a floor appended to the side wall and arranged to underlie the sealing disk, the post is coupled to the base, and the overfill-protection device is located in the interior region defined by the second ring and is free to move in the interior region away from the sealing disk to allow flow of pressurized fuel vapor from the vent port to the canister port through the at least one slot formed in the second ring.

5. The tank venting system of claim 4, wherein the base is formed to include radially extending inclined ribs coupled to the floor and arranged to lie under the sealing disk to limit movement of the sealing disk relative to the overfill-protection device yet allow sufficient movement of the overfill-protection device relative to the sealing disk while the overfill-protection device remains seated on the post to permit incoming atmospheric air admitted into the central vent chamber through the canister port to pass through the vent port between the inner rim of the overfill-protection device during high vacuum conditions in the vapor space of the fuel tank.

6. The tank venting system of claim 3, wherein the flow-control housing includes a base formed to include the tank port and a cover formed to include the canister port, the base is formed to include an interior port opening into the central vent chamber and a base tube formed to include a vent passageway terminating at the tank port and providing fluid communication between the interior port and the regulator branch of the fluid-conducting passageway, wherein the cover includes a cover tube formed to include a fluid-transfer passageway terminating at the canister port and communicating with the central vent chamber, and wherein the central vent chamber, vent passageway in the base tube, and fluid-transfer passageway in the cover tube cooperate to define the internal space of the flow-control housing.

7. The tank venting system of claim 1, wherein the flow-control housing is formed to include a central vent chamber communicating with the canister port and a vent port communicating with the tank port, the air/vapor flow regulator includes a sealing disk and an overfill-protection device formed to include an air-flow passageway defined by, in series, a central flow orifice, a vent-control chamber containing the sealing disk and communicating with the central flow orifice, and an outer orifice communicating with the central vent chamber, and the overfill-protection device is mounted for movement in the central vent chamber between a port-opening position disengaging a valve seat associated with the vent port and a port-closing position engaging the valve seat, wherein the overfill-protection device engages the valve seat associated with the vent port to assume the port-closing position and the sealing disk moves in the vent-control chamber to block flow of air and fuel vapor between the central flow orifice and the outer orifice during normal pressure/vacuum conditions to establish the fuel tank overfill protection system, wherein the overfill-protection device is configured to be lifted off the valve seat to allow flow of pressurized fuel vapor from the fluid-conducting passageway through the vent port and the vent-control chamber and out of the flow-control housing through the canister port upon exposure to pressurized fuel vapor flowing into the vent-control chamber through the tank port and the vent port whenever the pressure of fuel vapor extant in the fuel tank exceeds a predetermined minimum pressure to establish the fuel tank pressure-relief system, and wherein the overfill-protection device is moved to assume the port-closing position to place the central flow orifice of the air-flow passageway in communication with the vent port and to move the sealing device in the vent-control chamber from a normal flow-blocking position blocking flow of air from the outer orifice to the central flow orifice to a venting position allowing flow of air from the outer orifice to the central flow orifice upon exposure of the overfill-protection device to negative pressure extant in the vent port whenever a vacuum in the vapor space of the fuel tank has a magnitude that is greater than a predetermined subatmospheric level to establish the fuel tank vacuum relief system.

8. The tank venting system of claim 7, wherein the flow-control housing includes a base arranged to underlie the overfill-protection device and formed to include the valve seat and the vent port, the overfill-protection device includes a downwardly extending tubular stem formed to include the central flow orifice and the central flow orifice has an opening in a downwardly presented hemispherical sealing surface provided on a free end of the tubular stem and configured to mate with the valve seat to align the opening of the central flow channel in fluid communication with the vent port formed in the flow-control housing upon movement of the overfill-protection device to assume the port-closing position.

9. The tank venting system of claim 8, wherein the overfill-protection device further includes a flange appended to a proximal end of the tubular stem and formed to include the outer flow orifice and a lid arranged to overlie and engage the flange to form the vent-control chamber and place the vent-control chamber between and in fluid communication with the outer flow orifice and the central flow orifice and wherein the sealing disk is formed to include a central aperture aligned with the central flow orifice formed in the tubular stem to cause any pressurized fuel vapor extant in the vent port to pass through the central flow orifice in the tubular stem and the central aperture formed in the sealing disk to reach a portion of the vent-control chamber above the sealing disk and below a top wall of the lid and to exert a downward closing force on the sealing disk to retain the sealing disk in the orifice-closing position and to cause any negative pressure extant in the vent port to be transferred through the central flow orifice in the tubular stem and the central aperture formed in the sealing disk to reach the portion of the vent-control chamber above the sealing disk and below the top wall of the lid and to exert an upward opening suction force on the sealing disk to lift the sealing disk upwardly away from the flange to allow air to flow underneath the sealing disk from the outer orifice formed in the flange into the central orifice formed in the stem.

10. The tank venting system of claim 8, wherein the overfill-protection device further includes a flange appended to a proximal end of the tubular stem and a lid arranged to overlie and engage the flange to form the vent-control chamber, the lid includes a top wall formed to include the outer orifice and a side wall coupled to the top wall and to the flange, and wherein the sealing disk is arranged in the vent-control chamber to cause any pressurized fuel vapor extant in the vent port to pass through central vent orifice in tubular stem to reach a portion of the vent-control chamber under the sealing disk and above the flange and to exert an upward closing force on the sealing disk to retain the sealing disk in the orifice-closing position engaging the top wall of the lid and to cause any negative pressure extant in the vent port to be transferred through the central flow orifice to exert a downward opening suction force on the sealing disk to pull the sealing disk downwardly to engage the flange to allow air in the outer orifice formed in the top wall of the lid to flow to the central flow orifice in the tubular stem through an aperture formed in the sealing disk.

11. The tank venting system of claim 1, further comprising a first fuel tank vent unit including the flow controller and the first roll-over valve and a second fuel tank vent unit formed to include an inlet adapted to receive fuel vapor from the vapor space in a fuel tank and an outlet, the tank valve system further includes a vent unit conduit coupled to the outlet of the second fuel tank vent unit to conduct fuel vapor into the fluid-conducting passageway to cause fuel vapor discharged from the second fuel tank vent unit to combine with fuel vapor flowing through the fluid-conducting passageway to produce a fuel mixture that is delivered to the air/vapor flow regulator through the tank port.

12. The tank venting system of claim 11, wherein the tank valve system further includes a second roll-over valve located in the second fuel tank vent unit and configured to provide means for blocking flow of pressurized fuel vapor discharged from the vapor space of the fuel tank through the vent unit conduit to the air/vapor flow regulator in the first fuel tank vent unit whenever the second roll-over valve is tilted at least a selected number of degrees from a normal upright position.

13. The tank venting system of claim 1, wherein the air/vapor flow regulator includes a sealing disk having an inner rim defining a vent port, ribs located in the internal space formed in the flow-control housing and arranged to lie under the sealing disk to support a portion of the sealing disk away from the inner rim, and an overfill-protection device supported on the sealing disk to close the vent port normally to block flow of air and fuel vapor through the vent port during normal pressure/vacuum conditions to establish the fuel tank overfill-protection system and
    wherein the overfill-protection device is configured to be lifted off the sealing disk to allow flow of pressurized fuel vapor from the fluid-conducting passageway through the internal space of the flow-control housing and out of the flow-control housing through the canister port upon exposure to pressurized fuel vapor flowing into the internal space through the tank port and through the vent port whenever the pressure of fuel vapor extant in the fuel tank exceeds a predetermined minimum pressure to establish the fuel tank pressure-relief system, and
    wherein the sealing disk is made of a deformable material and a portion of the sealing disk located adjacent to the rim and unsupported by the ribs will be drawn downwardly in open spaces provided between the ribs and away from the overfill-protection device under a suction force extant in the tank port to allow flow of air past the overfill-protection device and through the vent port and tank port whenever the pressure of fuel vapor extant in the fuel tank exceeds a predetermined minimum pressure to establish the fuel tank pressure-relief system.

14. The tank venting system of claim 13, wherein the flow-control housing includes a base formed to include the tank port, a cover formed to include the canister port and a first ring and coupled to the base to form a central vent chamber therebetween defining a portion of the internal space, and a second ring coupled to the cover and located in the central vent chamber, the first ring surrounds the second ring and is concentric with the second ring to define an annular space therebetween, the first ring forms an annular outer side wall of the cover, at least one slot is formed in the second ring to allow flow of air and fuel vapor from an interior region defined by the second ring to the canister port, the sealing disk is trapped between a lowermost free end of the first ring on a side wall of the base to establish a sealed connection therebetween, the base includes a floor appended to the side wall and arranged to underlie the sealing disk, the ribs are coupled to the base, and the overfill-protection device is located in the interior region defined by the second ring and is free to move in the interior region away from the sealing disk to allow flow of pressurized fuel vapor from the vent ort to the canister port through the at least one slot formed in the second ring.

15. The tank venting system of claim 1, wherein the first roll-over valve comprises a housing having a ceiling formed to include an annular valve seat defining a vent port opening into an interior region formed in the housing, a buoyant float located in the interior region, a compression spring interposed between the buoyant float and a floor of the housing to provide means for lifting the buoyant float away from the floor during a vehicle rollover or tilting event, and a vent closure coupled to the buoyant float to move therewith in the interior region and configured to close and reopen the vent port, the vent closure including a closure disk, a short first pry-open finger coupled to the closure disk and arranged to extend downwardly toward the floor of the housing, and a relatively longer second pry-open finger coupled to the closure disk and arranged to extend downwardly toward the floor of the housing in spaced-apart relation to the short first pry-open finger, and wherein the first pry-open finger has a first length, the second pry-open finger has a longer second length, a lower portion of the first pry-open finger includes a radially inwardly extending first pry flange, and a lower portion of the second pry-open finger includes a radially inwardly extending second pry flange, and during downward movement of the buoyant float away from the ceiling and toward the floor, one part of the annular rim first engages the first pry flange to pull one portion of the closure disk away from mating, sealing engagement with the valve seat in a first disk-separation stage and then another part of the annular rim engages the second pry flange to pull another portion of the closure disk away from mating, sealing engagement with the valve seat in a later second disk-separation stage.

16. The tank venting system of claim 15, wherein the buoyant float includes a lower portion coupled to the compression spring and an upper portion including an upstanding post carrying a radially outwardly extending annular rim and an upwardly extending protuberance terminating at a rounded nose and the vent closure further includes a concave surface provided on an underside of the closure disk and arranged to contact the rounded nose of the protuberance when the rollover valve is in an upright position.

17. A tank venting system comprising a flow controller including a flow-control housing formed to include an internal space and an air/vapor flow regulator located in the internal space of the flow-control housing, the flow-control housing also being formed to include a tank port opening into the internal space and a canister port opening into the internal space and being adapted to communicate air and fuel vapor to and from the internal space and a fuel vapor recovery canister associated with the flow controller, and a tank valve system coupled to the tank port formed in the flow-control housing and adapted to communicate air and fuel vapor to and from the internal space in the flow-control housing and a vapor space in a fuel tank associated with the flow controller, the tank valve system comprising a fluid-conducting passageway communicating with the tank port and the vapor space in the fuel tank and a first roll-over valve configured to provide means in the fluid-conducting passageway for blocking flow of pressurized fuel vapor discharged from the vapor space of the fuel tank through the fluid-conducting passageway and the tank port to the internal space formed in the flow-control housing whenever the first roll-over valve is tilted at least a selected number of degrees from a normal upright position so that fuel vapor from the vapor space of the fuel tank is unable to flow through the fluid-conducting passageway to reach the internal space of the flow-control housing, and wherein the air/vapor flow regulator is configured to provide a flexible sealing member blocking discharge of fuel vapor extant in a portion of the fluid-conducting passageway located between the first roll-over valve and the tank port and pressurized at a magnitude below a predetermined pressure threshold during a fuel tank refueling activity to establish a fuel tank overfill protection system and a fuel tank pressure-relief system so that the vapor space of the fuel tank associated with the flow controller is not vented to the fuel vapor recovery canister associated with the flow controller via the internal space formed in the flow-control housing while the fuel tank is being filled with liquid fuel unless fuel vapor pressure in the fuel tank exceeds a predetermined minimum pressure that is higher than a pressure associated with fuel tank refueling activities and allowing flow of air and fuel vapor through the internal space formed in the flow-control housing between the canister and tank ports to regulate admission of ambient air from the atmosphere into the fuel tank through the flow-control housing and the fluid-conducting passageway when a vacuum characterized by at least a predetermined negative pressure has developed in the vapor space of the fuel tank associated with the flow controller to establish a fuel tank vacuum-relief system.

\* \* \* \* \*